US008684825B2

(12) United States Patent
Walker et al.

(10) Patent No.: US 8,684,825 B2
(45) Date of Patent: Apr. 1, 2014

(54) MULTIPLAYER GAMING DEVICE AND METHODS

(75) Inventors: Jay S. Walker, Ridgefield, CT (US); Robert C. Tedesco, Trumbull, CT (US)

(73) Assignee: Inventor Holdings, LLC, Stamford, CT (US)

(*) Notice: Subject to any disclaimer, the term of this patent is extended or adjusted under 35 U.S.C. 154(b) by 0 days.

(21) Appl. No.: 13/400,871

(22) Filed: Feb. 21, 2012

(65) Prior Publication Data

US 2012/0149461 A1 Jun. 14, 2012

Related U.S. Application Data

(63) Continuation of application No. 12/136,667, filed on Jun. 10, 2008, now Pat. No. 8,147,322.

(60) Provisional application No. 60/943,431, filed on Jun. 12, 2007.

(51) Int. Cl.

| | |
|---|---|
| ***A63F 9/24*** | (2006.01) |
| ***A63F 13/00*** | (2006.01) |
| ***G06F 17/00*** | (2006.01) |

(52) U.S. Cl.
USPC .......... 463/25

(58) Field of Classification Search
USPC .......... 463/25
See application file for complete search history.

(56) References Cited

U.S. PATENT DOCUMENTS

| | | | |
|---|---|---|---|
| 2,732,210 | A | 1/1956 | Heide et al. |
| 2,826,828 | A | 3/1958 | Hamilton |
| 4,157,829 | A | 6/1979 | Goldman et al. |
| 4,354,680 | A | 10/1982 | Kmiec |
| 4,363,485 | A | 12/1982 | Edwall |
| 4,437,664 | A | 3/1984 | Wiczer et al. |
| 4,487,414 | A | 12/1984 | Karkainen et al. |
| 4,572,509 | A | 2/1986 | Sitrick et al. |
| 4,586,707 | A | 5/1986 | McNeight |
| 4,592,546 | A | 6/1986 | Fascenda et al. |
| 4,621,814 | A | 11/1986 | Stepan et al. |
| 4,625,081 | A | 11/1986 | Lotito et al. |
| 4,636,951 | A | 1/1987 | Harlick |
| 4,650,190 | A | 3/1987 | Geiger |
| 4,657,247 | A | 4/1987 | Okada |

(Continued)

FOREIGN PATENT DOCUMENTS

| | | |
|---|---|---|
| DE | 4222896 | 1/1994 |
| EP | 0843272 | 5/1998 |

(Continued)

OTHER PUBLICATIONS

Word Puzzles With a Twist PUNZZLES Exercises for your brain, Pinnacle Solutions, 1995, 6 pp.

(Continued)

*Primary Examiner* — Xuan Thai
*Assistant Examiner* — Michael Grant
(74) *Attorney, Agent, or Firm* — Fincham Downs, LLC; Magdalena M. Fincham

(57) ABSTRACT

A plurality of gaming devices is linked so as to effectuate multiplayer game play. Multiplayer game play may cost more than single player game play, but may provide bonus payouts in the multiplayer game play. Various embodiments disclose symbol swapping, best ball, and match multiplayer game play.

16 Claims, 16 Drawing Sheets

(56) References Cited

U.S. PATENT DOCUMENTS

| | | | |
|---|---|---|---|
| 4,669,731 | A | 6/1987 | Clarke |
| 4,679,789 | A | 7/1987 | Okada |
| 4,685,677 | A | 8/1987 | Demar et al. |
| 4,760,245 | A | 7/1988 | Fukaya |
| 4,760,527 | A | 7/1988 | Sidley |
| 4,764,666 | A | 8/1988 | Bergeron |
| 4,836,546 | A | 6/1989 | DiRe et al. |
| 4,837,422 | A | 6/1989 | Dethloff et al. |
| 4,837,728 | A | 6/1989 | Barrie et al. |
| 4,838,552 | A | 6/1989 | Hagiwara |
| 4,856,787 | A | 8/1989 | Itkis |
| 4,858,930 | A | 8/1989 | Sato |
| 4,878,664 | A | 11/1989 | Brookes |
| 4,880,237 | A | 11/1989 | Kishishita |
| 4,922,522 | A | 5/1990 | Scanlon |
| 4,926,327 | A | 5/1990 | Sidley |
| 4,958,835 | A | 9/1990 | Tashiro et al. |
| 4,996,705 | A | 2/1991 | Entenmann et al. |
| 5,014,991 | A | 5/1991 | Mirando et al. |
| 5,035,625 | A | 7/1991 | Munson et al. |
| 5,038,022 | A | 8/1991 | Lucero |
| 5,042,818 | A | 8/1991 | Weingardt |
| 5,073,931 | A | 12/1991 | Audebert et al. |
| 5,083,271 | A | 1/1992 | Thacher et al. |
| 5,083,800 | A | 1/1992 | Lockton |
| 5,090,699 | A | 2/1992 | Friedman |
| 5,095,798 | A | 3/1992 | Okada et al. |
| 5,104,129 | A | 4/1992 | Hamalainen et al. |
| 5,108,115 | A | 4/1992 | Berman et al. |
| 5,114,155 | A | 5/1992 | Tillery et al. |
| 5,116,055 | A | 5/1992 | Tracy |
| 5,121,919 | A | 6/1992 | Marti |
| 5,121,928 | A | 6/1992 | Salerno-Sonneberg |
| 5,123,649 | A | 6/1992 | Tiberio |
| 5,127,044 | A | 6/1992 | Bonito et al. |
| 5,131,655 | A | 7/1992 | Ugawa |
| 5,132,900 | A | 7/1992 | Gilchrist et al. |
| 5,152,529 | A | 10/1992 | Okada |
| 5,159,549 | A | 10/1992 | Hallman, Jr. et al. |
| 5,173,851 | A | 12/1992 | Off et al. |
| 5,178,390 | A | 1/1993 | Okada |
| 5,179,517 | A | 1/1993 | Sarbin et al. |
| 5,180,309 | A | 1/1993 | Egnor |
| 5,186,471 | A | 2/1993 | Vancraeynest |
| 5,213,327 | A | 5/1993 | Kitaue |
| 5,213,337 | A | 5/1993 | Sherman |
| 5,242,163 | A | 9/1993 | Fulton |
| 5,258,837 | A | 11/1993 | Gormley |
| 5,265,874 | A | 11/1993 | Dickinson et al. |
| 5,275,400 | A | 1/1994 | Weingardt et al. |
| 5,280,909 | A | 1/1994 | Tracy |
| 5,283,734 | A | 2/1994 | Von Kohorn |
| 5,320,351 | A | 6/1994 | Suzuki |
| 5,324,035 | A | 6/1994 | Morris et al. |
| 5,332,076 | A | 7/1994 | Ziegert |
| 5,342,047 | A | 8/1994 | Heidel et al. |
| 5,342,049 | A | 8/1994 | Wichinsky et al. |
| RE34,728 | E | 9/1994 | Hall-Tipping |
| 5,344,144 | A | 9/1994 | Canon |
| 5,359,510 | A | 10/1994 | Sabalianskas |
| 5,370,399 | A | 12/1994 | Liverance |
| 5,377,973 | A | 1/1995 | Duron et al. |
| 5,393,051 | A | 2/1995 | Merino et al. |
| 5,393,057 | A | 2/1995 | Marnell, II |
| 5,393,061 | A | 2/1995 | Manship et al. |
| 5,393,071 | A | 2/1995 | Best |
| 5,409,225 | A | 4/1995 | Kelly et al. |
| 5,429,361 | A | 7/1995 | Raven et al. |
| 5,453,928 | A | 9/1995 | Kaminkow et al. |
| 5,459,825 | A | 10/1995 | Anderson et al. |
| 5,472,194 | A | 12/1995 | Breeding et al. |
| 5,482,289 | A | 1/1996 | Weingardt |
| 5,494,287 | A | 2/1996 | Manz |
| 5,511,781 | A | 4/1996 | Wood et al. |
| 5,519,433 | A | 5/1996 | Lappington et al. |
| 5,544,892 | A | 8/1996 | Breeding |
| 5,546,523 | A | 8/1996 | Gatto |
| 5,558,339 | A | 9/1996 | Perlman |
| 5,559,312 | A | 9/1996 | Lucero |
| 5,560,603 | A | 10/1996 | Seelig et al. |
| 5,561,811 | A | 10/1996 | Bier |
| 5,564,700 | A | 10/1996 | Celona |
| 5,577,971 | A | 11/1996 | File |
| 5,580,309 | A | 12/1996 | Piechoviak et al. |
| 5,593,349 | A | 1/1997 | Miguel et al. |
| 5,597,163 | A | 1/1997 | Takemoto et al. |
| 5,603,502 | A | 2/1997 | Nakagawa |
| 5,611,535 | A | 3/1997 | Tiberio |
| 5,611,730 | A | 3/1997 | Weiss |
| 5,621,201 | A | 4/1997 | Langhans et al. |
| 5,630,586 | A | 5/1997 | Lowden |
| 5,630,757 | A | 5/1997 | Gagin et al. |
| 5,637,844 | A | 6/1997 | Eiba |
| 5,639,088 | A | 6/1997 | Schneider et al. |
| 5,643,088 | A | 7/1997 | Vaughn et al. |
| 5,653,635 | A | 8/1997 | Breeding |
| 5,655,961 | A | 8/1997 | Acres et al. |
| 5,674,128 | A | 10/1997 | Holch et al. |
| 5,683,082 | A | 11/1997 | Takemoto et al. |
| 5,695,400 | A | 12/1997 | Fennell, Jr. et al. |
| 5,695,402 | A | 12/1997 | Stupak |
| 5,697,844 | A | 12/1997 | Von Kohorn |
| 5,702,304 | A | 12/1997 | Acres et al. |
| 5,711,715 | A | 1/1998 | Ringo et al. |
| 5,718,429 | A | 2/1998 | Keller, Jr. |
| 5,741,183 | A | 4/1998 | Acres et al. |
| 5,752,882 | A | 5/1998 | Acres et al. |
| 5,755,621 | A | 5/1998 | Marks et al. |
| 5,761,647 | A | 6/1998 | Boushy |
| 5,762,552 | A | 6/1998 | Vuong et al. |
| 5,766,076 | A | 6/1998 | Pease et al. |
| 5,768,382 | A | 6/1998 | Schneier et al. |
| 5,770,533 | A | 6/1998 | Franchi |
| 5,772,509 | A | 6/1998 | Weiss |
| 5,779,549 | A | 7/1998 | Walker et al. |
| 5,788,573 | A | 8/1998 | Baerlocher et al. |
| 5,810,361 | A | 9/1998 | Kadlic |
| 5,811,772 | A | 9/1998 | Lucero |
| 5,813,913 | A | 9/1998 | Berner et al. |
| 5,816,915 | A | 10/1998 | Kadlic |
| 5,816,917 | A | 10/1998 | Kelmer et al. |
| 5,816,918 | A | 10/1998 | Kelly et al. |
| 5,820,459 | A | 10/1998 | Acres et al. |
| 5,823,879 | A | 10/1998 | Goldberg et al. |
| 5,830,063 | A | 11/1998 | Byrne |
| 5,830,067 | A | 11/1998 | Graves et al. |
| 5,833,537 | A | 11/1998 | Barrie |
| 5,833,540 | A | 11/1998 | Miodunski et al. |
| 5,836,586 | A | 11/1998 | Marks et al. |
| 5,846,132 | A | 12/1998 | Junkin |
| 5,848,932 | A | 12/1998 | Adams |
| 5,851,010 | A | 12/1998 | Feinberg |
| 5,851,147 | A | 12/1998 | Stupak et al. |
| 5,855,008 | A | 12/1998 | Goldhaber et al. |
| 5,855,516 | A | 1/1999 | Eiba |
| 5,859,416 | A | 1/1999 | Gatto |
| 5,863,044 | A | 1/1999 | Ince |
| 5,871,398 | A | 2/1999 | Schneier et al. |
| 5,882,260 | A | 3/1999 | Marks et al. |
| 5,882,262 | A | 3/1999 | Ballhorn |
| 5,910,048 | A | 6/1999 | Feinberg |
| 5,945,988 | A | 8/1999 | Williams |
| 5,964,660 | A | 10/1999 | James et al. |
| 5,967,896 | A | 10/1999 | Jorasch et al. |
| 5,971,271 | A | 10/1999 | Wynn et al. |
| 5,971,850 | A | 10/1999 | Liverance |
| 5,974,442 | A | 10/1999 | Adams |
| 5,979,702 | A | 11/1999 | Hennessey et al. |
| 5,980,384 | A | 11/1999 | Barrie |
| 5,983,200 | A | 11/1999 | Slotznick |
| 5,993,314 | A | 11/1999 | Dannenberg et al. |
| 6,009,412 | A | 12/1999 | Storey |
| 6,010,404 | A | 1/2000 | Walker et al. |
| 6,012,982 | A | 1/2000 | Piechoviak |

(56) References Cited

U.S. PATENT DOCUMENTS

| | | | |
|---|---|---|---|
| 6,019,374 A | 2/2000 | Breeding | |
| 6,024,642 A | 2/2000 | Stupak | |
| 6,033,307 A | 3/2000 | Vancura | |
| 6,039,648 A | 3/2000 | Guinn et al. | |
| 6,048,269 A | 4/2000 | Burns et al. | |
| 6,068,552 A | 5/2000 | Walker et al. | |
| 6,076,101 A | 6/2000 | Kamakura et al. | |
| 6,077,162 A | 6/2000 | Weiss | |
| 6,077,163 A | 6/2000 | Walker et al. | |
| 6,089,975 A | 7/2000 | Dunn | |
| 6,089,980 A | 7/2000 | Gauselmann | |
| 6,093,100 A | 7/2000 | Singer et al. | |
| 6,110,041 A | 8/2000 | Walker et al. | |
| 6,113,102 A | 9/2000 | Marks et al. | |
| 6,117,001 A | 9/2000 | Lvov | |
| 6,135,882 A | 10/2000 | Kadlic | |
| 6,142,847 A | 11/2000 | Kodachi et al. | |
| 6,142,872 A | 11/2000 | Walker et al. | |
| 6,142,876 A | 11/2000 | Cumbers | |
| 6,162,122 A | 12/2000 | Acres et al. | |
| 6,165,071 A | 12/2000 | Weiss | |
| 6,168,159 B1 | 1/2001 | Kulick | |
| 6,193,606 B1 | 2/2001 | Walker et al. | |
| 6,206,782 B1 | 3/2001 | Walker et al. | |
| 6,210,275 B1 | 4/2001 | Olsen | |
| 6,213,873 B1 | 4/2001 | Gasper et al. | |
| 6,224,486 B1 | 5/2001 | Walker et al. | |
| 6,234,897 B1 | 5/2001 | Frohm et al. | |
| 6,241,608 B1 | 6/2001 | Torango | |
| 6,247,643 B1 | 6/2001 | Lucero | |
| 6,254,480 B1 | 7/2001 | Zach | |
| 6,254,481 B1 | 7/2001 | Jaffe | |
| 6,254,483 B1 | 7/2001 | Acres | |
| 6,257,981 B1 | 7/2001 | Acres et al. | |
| 6,264,560 B1 | 7/2001 | Goldberg et al. | |
| 6,270,412 B1 | 8/2001 | Crawford et al. | |
| 6,287,194 B1 | 9/2001 | Okada et al. | |
| 6,287,201 B1 | 9/2001 | Hightower | |
| 6,287,202 B1 | 9/2001 | Pascal et al. | |
| 6,293,865 B1 | 9/2001 | Kelly et al. | |
| 6,293,866 B1 | 9/2001 | Walker et al. | |
| 6,309,307 B1 | 10/2001 | Krause et al. | |
| 6,312,332 B1 | 11/2001 | Walker et al. | |
| 6,319,122 B1 | 11/2001 | Packes et al. | |
| 6,331,144 B1 | 12/2001 | Walker et al. | |
| 6,334,814 B1 | 1/2002 | Adams | |
| 6,336,861 B1 | 1/2002 | Konoe et al. | |
| 6,343,989 B1 | 2/2002 | Clements | |
| 6,352,479 B1 | 3/2002 | Sparks, II | |
| 6,361,441 B1 | 3/2002 | Walker et al. | |
| 6,364,765 B1 | 4/2002 | Walker et al. | |
| 6,368,216 B1 | 4/2002 | Hedrick et al. | |
| 6,375,567 B1 | 4/2002 | Acres | |
| 6,375,568 B1 | 4/2002 | Roffman et al. | |
| 6,379,247 B1 | 4/2002 | Walker et al. | |
| 6,383,078 B1 | 5/2002 | Yacenda | |
| 6,392,613 B1 | 5/2002 | Goto | |
| 6,394,456 B1 | 5/2002 | Long | |
| 6,394,904 B1 | 5/2002 | Stalker | |
| 6,413,160 B1 | 7/2002 | Vancura | |
| 6,416,408 B2 | 7/2002 | Tracy et al. | |
| 6,425,828 B2 | 7/2002 | Walker et al. | |
| 6,427,063 B1 | 7/2002 | Cook et al. | |
| 6,434,398 B1 | 8/2002 | Inselberg | |
| 6,439,993 B1 | 8/2002 | O'Halloran | |
| 6,443,839 B2 | 9/2002 | Stockdale et al. | |
| 6,461,241 B1 | 10/2002 | Webb et al. | |
| 6,464,583 B1 | 10/2002 | Kidron | |
| 6,468,155 B1 | 10/2002 | Zucker et al. | |
| 6,471,208 B2 | 10/2002 | Toseloff et al. | |
| 6,473,740 B2 | 10/2002 | Cockrill et al. | |
| 6,482,089 B2 | 11/2002 | DeMar et al. | |
| 6,503,146 B2 | 1/2003 | Walker et al. | |
| 6,511,377 B1 | 1/2003 | Weiss | |
| 6,514,144 B2 | 2/2003 | Riendeau et al. | |
| 6,524,189 B1 | 2/2003 | Rautila | |
| 6,536,037 B1 | 3/2003 | Guheen et al. | |
| 6,565,442 B2 | 5/2003 | La Mura et al. | |
| 6,573,824 B1 | 6/2003 | Lovegreen et al. | |
| 6,584,307 B1 | 6/2003 | Antonucci et al. | |
| 6,629,081 B1 | 9/2003 | Cornelius et al. | |
| 6,640,204 B2 | 10/2003 | Feldman | |
| 6,645,074 B2 | 11/2003 | Thomas | |
| 6,648,753 B1 | 11/2003 | Tracy et al. | |
| 6,652,378 B2 | 11/2003 | Cannon et al. | |
| 6,656,048 B2 | 12/2003 | Olsen | |
| 6,663,487 B1 | 12/2003 | Ladner | |
| 6,676,521 B1 | 1/2004 | La Mura et al. | |
| 6,692,353 B2 | 2/2004 | Walker et al. | |
| 6,712,699 B2 | 3/2004 | Walker et al. | |
| 6,733,390 B2 | 5/2004 | Walker et al. | |
| 6,752,717 B2 | 6/2004 | Vancura | |
| 6,755,737 B2 | 6/2004 | Jackson et al. | |
| 6,755,741 B1 | 6/2004 | Rafaeli | |
| 6,796,708 B2 | 9/2004 | Weston | |
| 6,819,929 B2 | 11/2004 | Antonucci et al. | |
| 6,827,645 B2 | 12/2004 | Morita et al. | |
| 6,837,793 B2 | 1/2005 | McClintic | |
| 6,843,724 B2 | 1/2005 | Walker et al. | |
| 6,860,810 B2 | 3/2005 | Cannon et al. | |
| 6,866,586 B2 | 3/2005 | Oberberger et al. | |
| 6,902,478 B2 | 6/2005 | McClintic | |
| 6,908,390 B2 | 6/2005 | Nguyen | |
| 6,923,719 B2 | 8/2005 | Wolf | |
| 6,942,574 B1 | 9/2005 | LeMay et al. | |
| 6,961,678 B2 | 11/2005 | Feldman | |
| 7,020,697 B1 | 3/2006 | Goodman et al. | |
| 7,066,815 B2 | 6/2006 | Walker et al. | |
| 7,079,985 B2 | 7/2006 | Feldman et al. | |
| 7,112,138 B2 | 9/2006 | Hedrick et al. | |
| 7,116,284 B2 | 10/2006 | Kato et al. | |
| 7,147,557 B1 | 12/2006 | Tracy et al. | |
| 7,149,698 B2 | 12/2006 | Guheen et al. | |
| 7,167,844 B1 | 1/2007 | Leong et al. | |
| 7,175,521 B2 | 2/2007 | McClintic | |
| 7,192,352 B2 | 3/2007 | Walker et al. | |
| 7,226,358 B2 | 6/2007 | Miller et al. | |
| 7,353,274 B1 | 4/2008 | Rouhi et al. | |
| 7,361,085 B2 | 4/2008 | Packes et al. | |
| 7,364,510 B2 | 4/2008 | Walker et al. | |
| 7,467,198 B2 | 12/2008 | Goodman et al. | |
| 7,507,169 B2 | 3/2009 | Kamen | |
| 7,895,641 B2 | 2/2011 | Schneier et al. | |
| 2002/0037767 A1 | 3/2002 | Ebih | |
| 2002/0055381 A1 | 5/2002 | Tarantino | |
| 2003/0027628 A1 | 2/2003 | Luciano | |
| 2003/0064807 A1* | 4/2003 | Walker et al. | 463/42 |
| 2003/0078101 A1 | 4/2003 | Walker et al. | |
| 2003/0119579 A1* | 6/2003 | Walker et al. | 463/20 |
| 2003/0224852 A1* | 12/2003 | Walker et al. | 463/20 |
| 2004/0123129 A1 | 6/2004 | Ginter et al. | |
| 2004/0242297 A1* | 12/2004 | Walker et al. | 463/13 |
| 2007/0157315 A1 | 7/2007 | Moran | |
| 2007/0214030 A1 | 9/2007 | Shear et al. | |

FOREIGN PATENT DOCUMENTS

| | | |
|---|---|---|
| GB | 2161008 | 1/1986 |
| GB | 2167676 | 3/1996 |
| WO | 94/01839 | 1/1994 |
| WO | 96/07867 | 3/1996 |
| WO | 96/08295 | 3/1996 |
| WO | 03/018150 | 3/2003 |

OTHER PUBLICATIONS

How to Play the Pool! Compete with People all across the Net and win big prizes, Jan. 1996, 2 pp.
Contest: Worst Experiences with a Salesperson, Galileo, Jan. 1996, 2 pp.
Who's In Front of the behind contest!, Jan. 1996, 2 pp.
The Rules, Bert & Associates, Jan. 1996, 4 pp.
Alpha Sports Games You Could Win $10,000 this week, Jan. 1996, 3 pp.

(56) References Cited

OTHER PUBLICATIONS

Yoyodyne Games, Jan. 1996, 6 pp.
Rose, Bob "New Ways for the House to Win", St. Louis Post-Dispatch, Oct. 3, 1996, 1 pg.
Grochowski, John, "Players Look for Edge with Casino Gimmicks", Chicago Sun Times, Aug. 25, 1995, 1 pg.
"Hot Slot and Reel Deals" Atlantic City Insider, Oct. 1996, 1 pg.
Mega Vigil, Las Vegas Advisor, Jul. 1998, 1 pg.
Red Baron—Operation, Maintenance and Service Manual, Copyright 1981 by Atari Inc., 3 pp.
Website: "Atari Red Baron Page", 2001, 2 pp.
The Electric Company, Math Fun, Intellevision Productions, Inc., Mar. 28, 2001, 4 pp.
Eatough, Mitch, "Gamezilla! Unreal Tournament by GT Interactive", Mar. 28, 2001, 2 pp.
THINKfast thinkfas htm THINKfast Software, Mar. 28, 2001, 2 pp.
Win $200! from The Gate, Jan. 1996, 2 pp.
"Atari", Byte, May 1983, 1 pg.
Borden, Jeff, "WMS Betting That Grown-Ups Want to Play; Kids Game Maker Hopes Slots Will Boost Its Stock", Crain's Chicago Business, May 20, 1996, 3 pp.
Buckley, Taylor J., "The Quest for Gambling's Holy Grail", Industry Seeks Next Generation Slot Machine, USA Today, May 20, 1996, 3 pp.
PR Newswire, Business Desk, Status Game Corp., Newington, CT, Mar. 12, 1996, 2 pp.
Grochowski, John, "Empress III has power of predecessors", Chicago Sun-Times, Jul. 7, 1996, 2 pp.
Gebeloff, Rober, "His AOL Game is a Winner; Real Escape Man", The Record, Jan. 7, 1997, 3 pp.
"Casino Data Systems Introduces Real Deal, Video Poker Series, Increased Player Entertainment With On-Screen Video Reel", PR Newswire, Apr. 23, 1997, 1 pg.
Slots of Trivia Win 95 at Rocket Download, Slots of Trivia Win 95, download date: Sep. 17, 1999, 2 pp.
Website: "Welcome to WinSite", Casino Winsite: Slot Machine Games, download date: Sep. 17, 1999, 1 pg.
Website: "Win95 Games, Cards and Gambling", Sep. 17, 1999, 2 pp.
"Slots of Trivia v1.3 Payoffs Help Documentation", Ultimate Software, download date: Feb. 2000, 2 pp.
Slots of Trivia v1.3 Game Mode Help Documentation, Ultimate Software, download date: Feb. 2000, 1 pg.
Microsoft Windows, Solitaire, 1981, 1 pg.
Casino's Computers Keep Tabs on Losers, Chicago Tribune, Oct. 2, 1985, 3 pp.
Fisher, Harvey, "Casino Law Ends Rebates for Big-Time Losers", The Record, Jan. 15, 1998, 2 pp.
Kent, Bill, "New Boardwalk Barter; Atlantis Introduces A Token as Enticement", The Record, Jul. 22, 1998, 3 pp.
Raphel, Murray, Casinos gamble on direct mail: Atlantic City casinos; Direct Marketing Magazine, Feb. 1992, 5 pp.
Freedman, David H., "Odds Man In", Forbes, Oct. 25, 1993, 5 pp.
Franklin, Stephen, "Pinball Power Puts Money Into The Slots," Chicago Tribune, May 9, 1994, 3 pp.
Salmon-Heyneman, Jana, "Gaming propels fastest growing publicly traded firm in valley," Las Vegas Business Press, Jul. 11, 1994, 5 pp.
Gronchowski, John, Casino Insider Offers A Guide to Freebies, Chicago Sun-Times, Aug. 12, 1994, 2 pp.
Troy, Timothy N., "High Stakes technology; technology for guest retention management", Hotel & Motel Management, Sep. 19, 1994, 4 pp.
Troy, Timothy N. "Flexability a key for vendors betting on casinos; Micro Systems Inc.'s 8700 point-of-sale system", Hotel & Motel Management, Sep. 19, 1994, 2 pp.
Grochowski, John "Riverboat Comp Systems Cracking a Case in Point", Chicago Sun-Times, Mar. 17, 1995, 1 pg.
Sherman, Debra, "Company Launches New Player Tracking System", The Reuter Asia-Pacific Profile Business Report, Oct. 20, 1995, 2 pp.
.Berry, Kate, "Anchor Gaming Inc.", Investor's Business Daily, May 2, 1996, The New America, 3 pp.
Mattox, Jake, "Huntington Press: Publishing the books on Las Vegas", Las Vegas Business Press, Sep. 16, 1996, 3 pp.
Open Market Announces Sale of OM-Express Desktop Software Product to DocuMagix, PR Newswire, Nov. 7, 1996, 3 pp.
Grochowski, John, "Comp points add up faster playing slots", Chicago Sun-Times, Nov. 8, 1996, 3 pp.
Microsoft Windows, Solitaire screens and information, (www.microsoft.com/WINDOWS2000/en/professional/help/) Download date: Mar. 19, 2001, 4 pp.
Tetris Deluxe (GB) Reviews, dooyoo.co.uk, download date: Nov. 8, 2006, 9 pp.
Scarne's Encyclopedia of Games by John Scarne, copyright 1973, 50 pp.
Sorensen, Rick, IGT Press Releases, "Triple Play Draw Poker Takes Casino Industry By Storm", Feb. 18, 1998, 1 pg.
Ciaffone, Bob, "Re: Duplicate poker tourneys?", The Gambling Forum Archive, Aug. 2000, 1 pg.
Off the Kuff: Poker Tournaments Illegal, Mar. 8, 2004, 4 pp.
Kelley, Brent, "Best Ball—Definition of Best Ball", May 7, 2004, 2 pp.
Hold'em Challenge TM Video Poker, IGT, www.the-underdogsorg/game/php?id+4218), May 7, 2004, 1 pg.
Website: Rules of Card Games: Bridge, (http //www pagat com//boston/bridge html), download date: May 7, 2004, 5 pp.
Website: "Solitaire Central—Poker Patience Pack", (http //www solitairecentral com/pokerpak html), download date: May 7, 2004, 3 pp.
Website: "Action Gaming Inc/Video Poker Design/Architecture of Success/Matrix Poker", (http //www actiongaming com/productdesigns/matrixpoker asp), download date: Jun. 3, 2004, 2 pp.
Website: Brokopp, John G., "One Way to Manipulate Player's Clubs", Casino City Times, Feb. 6, 2001, (http // brokopp casinocitytimes com/articles/534 html), 3 pp.
Dancer, Bob and Compton, Jeffrey, "Player's Edge: Cannery's machines tighter than most locals' casinos", Las Vegas Review-Journal (Nevada), Jan. 10, 2003, 2 pp.
Website: Brokopp, John G, "Player's Club Strategy for Couples", Casino City Times, Dec. 3, 2003, (http // brokopp casinocitytimes com/articles/8065 html), 3 pp.
Website: "Tunica Casino Slot and Table Play Club", (http //www tunica-ms com/casino_slot_clubs htm), download date: Mar. 26, 2004. 3 pp.
Website: "CC&GTCC 3rd Annual Championship Poker Challenge during the CC&GTCC Convention", (http //www ccgtcc com/poker2001 htm), May 26, 2001, 3 pp.
Website: "Money Time at Casino Windsor", (http //www casinowindsor com/casino/slots/moneytime htm), download date: Jul. 25, 2001, 1 pg.
Fine, Adam, "Players Network Gaming Guide Article—Big River", The Casino Player, (http //www playersnetwork com/traveVarticles/big-river 001,005 html), download date: Jul. 25, 2001, 2 pp.
Website: "Casino Circle! Presents $$$ FREE $$$ Online Slot Tournaments and other Choice Online Casino Games of Chance, Luck and Skill that PAY-OFF!", (http www sidewalkshoppes com/slots_free_tournaments html), download date: Jul. 26, 2001, 8 pp.
Website: "Casinos feituring Slot Tournaments in Las Vegas—Slot Tournaments and how they work", (http www interexna com/tournaments html), download date: Jul. 26, 2001, 2 pp.
Website: "gameland.com", (http www gameland com/home/), download date: Sep. 5, 2001, 2 pp.
Notice of Allowance for U.S. Appl. No. 10/159,945 mailed Sep. 26, 2006, 4 pp.
Office Action for U.S. Appl. No. 10/159,945 mailed Dec. 13, 2006, 6 pp.
Office Action for U.S. Appl. No. 10/159,945 mailed Aug. 23, 2005, 12 pp.
Office Action for U.S. Appl. No. 10/794,338 mailed Aug. 1, 2007, 12 pp.
Office Action for U.S. Appl. No. 10/794,338 mailed Feb. 27, 2007, 11 pp.

(56) References Cited

OTHER PUBLICATIONS

Office Action for U.S. Appl. No. 10/794,338 mailed Jan. 30, 2007, 11 pp.
Office Action for U.S. Appl. No. 10/794,338 mailed Aug. 11, 2006, 8 pp.
Office Action for U.S. Appl. No. 10/794,338 mailed Dec. 20, 2005, 5 pp.
Notice of Allowance for U.S. Appl. No. 10/752,068 mailed Sep. 22, 2004, 8 pp.
Notice of Allowance for U.S. Appl. No. 10/811,583 mailed Dec. 13, 2007, 6 pp.
Office Action for U.S. Appl. No. 10/811,583 mailed Jul. 10, 2007, 17 pp.
Office Action for U.S. Appl. No. 10/811,583 mailed Jan. 31, 2007, 11 pp.
Office Action for U.S. Appl. No. 10/811,583 mailed Jun. 27, 2006, 7 pp.
Office Action for U.S. Appl. No. 10/842,405 mailed Feb. 10, 2009, 23 pp.
Notice of Allowance for U.S. Appl. No. 10/842,405 mailed Mar. 24, 2008, 5 pp.
Office Action for U.S. Appl. No. 10/842,405 mailed Dec. 28, 2007, 6 pp.
Notice of Allowance for U.S. Appl. No. 11/675,144 mailed Feb. 22, 2011, 10 pp.
Office Action for U.S. Appl. No. 11/675,144 mailed Sep. 17, 2010, 13 pp.
Office Action for U.S. Appl. No. 11/675,144 mailed Jun. 1, 2009, 12 pp.
Office Action for U.S. Appl. No. 11/675,144 mailed Sep. 25, 2008, 16 pp.
Notice of Allowance for U.S. Appl. No. 11/422,778 mailed Nov. 29, 2007, 6 pp.
Office Action for U.S. Appl. No. 11/422,778 mailed Sep. 20, 2007, 11 pp.
Office Action for U.S. Appl. No. 11/422,778 mailed Mar. 20, 2007, 10 pp.
Office Action for U.S. Appl. No. 11/422,784 mailed May 22, 2009, 13 pp.
Office Action for U.S. Appl. No. 11/422,784 mailed Sep. 18, 2008, 12 pp.
Office Action for U.S. Appl. No. 11/422,784 mailed Apr. 14, 2008, 21 pp.
Office Action for U.S. Appl. No. 11/422,784 mailed Oct. 3, 2007, 21 pp.
Office Action for U.S. Appl. No. 11/422,784 mailed Apr. 2, 2007, 9 pp.
Office Action for U.S. Appl. No. 10/969,687 mailed Feb. 23, 2011, 10 pp.
Office Action for U.S. Appl. No. 10/969,687 mailed Aug. 2, 2010, 14 pp.
Office Action for U.S. Appl. No. 10/969,687 mailed Dec. 23, 2009, 14 pp.
Office Action for U.S. Appl. No. 10/969,687 mailed Jul. 6, 2009, 15 pp.
Office Action for U.S. Appl. No. 10/969,687 mailed Dec. 10, 2008, 11 pp.
Office Action for U.S. Appl. No. 10/969,687 mailed Jul. 3, 2008, 10 pp.
Office Action for U.S. Appl. No. 10/969,687 mailed Dec. 10, 2007, 8 pp.
Office Action for U.S. Appl. No. 10/969,687 mailed Jun. 8, 2007, 5 pp.
Office Action for U.S. Appl. No. 11/425,010 mailed Mar. 3, 2010, 18 pp.
Office Action for U.S. Appl. No. 11/425,010 mailed Aug. 24, 2009, 9 pp.
Office Action for U.S. Appl. No. 11/425,010 mailed Aug. 31, 2009, 11 pp.
Notice of Allowance for U.S. Appl. No. 11/427,131 mailed Aug. 21, 2009, 4 pp.
Notice of Allowance for U.S. Appl. No. 11/427,131 mailed Jan. 30, 2009, 7 pp.
Office Action for U.S. Appl. No. 11/427,131 mailed Jul. 9 , 2008, 8 pp.
Office Action for U.S. Appl. No. 11/427,131 mailed Mar. 4, 2008, 7 pp.
Office Action for U.S. Appl. No. 11/427,131 mailed Aug. 22, 2007, 9 pp.
Office Action for U.S. Appl. No. 11/427,131 mailed Apr. 30, 2007, 8 pp.
Office Action for U.S. Appl. No. 11/427,131 mailed Sep. 12, 2006, 9 pp.
Office Action for U.S. Appl. No. 11/532,313 mailed Mar. 1, 2010, 8 pp.
Office Action for U.S. Appl. No. 11/532,313 mailed May 20, 2009, 22 pp.
Office Action for U.S. Appl. No. 11/532,313 mailed Sep. 17, 2008, 6 pp.
Office Action for U.S. Appl. No. 11/561,485 mailed Nov. 9, 2010, 11 pp.
Office Action for U.S. Appl. No. 11/567,635 mailed Aug. 4, 2010, 10 pp.
Office Action for U.S. Appl. No. 11/567,635 mailed Jan. 20, 2010, 7 pp.
Office Action for U.S. Appl. No. 11/624,716 mailed May 29, 2009, 14 pp.
Office Action for U.S. Appl. No. 11/624,716 mailed Oct. 6, 2008, 10 pp.
Notice of Allowance for U.S. Appl. No. 11/624,752 mailed Jul. 2, 2008, 6 pp.
Notice of Allowance for U.S. Appl. No. 11/624,798 mailed Jul. 2, 2008, 6 pp.
Notice of Allowance for U.S. Appl. No. 11/624,764 mailed Mar. 24, 2011, 7 pp.
Notice of Allowance for U.S. Appl. No. 11/624,764 mailed Sep. 2, 2011, 5 pp.
Office Action for U.S. Appl. No. 11/624,764 mailed Jan. 7, 2010, 11 pp.
Office Action for U.S. Appl. No. 11/624,764 mailed May 13, 2009, 9 pp.
Office Action for U.S. Appl. No. 11/624,764 mailed Nov. 4, 2008, 10 pp.
Office Action for U.S. Appl. No. 12/166,118 mailed Jul. 26, 2010, 6 pp.
Notice of Allowance for U.S. Appl. No. 09/152,402 mailed Oct. 3, 2000, 4 pp.
Office Action for U.S. Appl. No. 09/152,402 mailed May 22, 2000, 12 pp.
Notice of Allowance for U.S. Appl. No. 09/108,827 mailed Jun. 15, 2001, 2 pp.
Office Action for U.S. Appl. No. 09/108,827 mailed Mar. 23, 2000, 9 pp.
Office Action for U.S. Appl. No. 09/108,827 mailed Oct. 26, 2000, 7 pp.
Notice of Allowance for U.S. Appl. No. 09/108,646 mailed Nov. 28, 2001, 2 pp.
Office Action for U.S. Appl. No. 09/108,646 mailed Dec. 28, 2000, 5 pp.
Office Action for U.S. Appl. No. 09/108,646 mailed Jan. 7, 2000, 4 pp.
Office Action for U.S. Appl. No. 09/108,646 mailed May 10, 2000, 5 pp.
Office Action for U.S. Appl. No. 09/108,646 mauiled Jun. 18, 2001, 6 pp.
Supplemental Notice of Allowance for U.S. Appl. No. 09/590,021 mailed Dec. 4, 2011, 4 pp.
Notice of Allowance for U.S. Appl. No. 09/590,021 mailed Dec. 3, 2011, 4 pp.
Office Action for U.S. Appl. No. 09/590,021 mailed Jun. 20, 2001, 6 pp.

(56) References Cited

OTHER PUBLICATIONS

Office Action for U.S. Appl. No. 09/768,567 mailed Jul. 6, 2001, 13 pp.
Notice of Allowance for U.S. Appl. No. 10/006,402 mailed Jan. 28, 2004, 2 pp.
Office Action for U.S. Appl. No. 10/006,402 mailed Sep. 8, 2003, 7 pp.
Office Action for U.S. Appl. No. 10/006,402 mailed Mar. 12, 2003, 5 pp.
Notice of Allowance for U.S. Appl. No. 10/067,576 mailed Nov. 7, 2003, 4 pp.
Office Action for U.S. Appl. No. 10/067,576 mailed Feb. 28, 2003, 6 pp.
Notice of Allowance for U.S. Appl. No. 10/023,149 mailed Jun. 17, 2004, 4 pp.
International Search Report for PCT/US04/06805 mailed Aug. 1, 2006, 6 pp.
Written Opinion for PCT/US05/10559 mailed Aug. 17, 2006, 5 pp.
International Search Report for PCT/US05/10559 mailed Aug. 1, 2006, 6 pp.
International Search Report for PCT/US97/07703 mailed Feb. 20, 1998, 6 pp.
Notice of Allowance for U.S. Appl. No. 09/793,020 mailed Sep. 9, 2002, 7 pp.
Notice of Allowance for U.S. Appl. No. 09/793,020 mailed Apr. 12, 2002, 9 pp.
Office Action for U.S. Appl. No. 09/793,020 mailed Sep. 26, 2001, 7 pp.
Office Action for U.S. Appl. No. 11/761,873 mailed Apr. 4, 2011, 13 pp.
Office Action for U.S. Appl. No. 11/671,904 mailed Apr. 1, 2011, 8 pp.
Office Action for U.S. Appl. No. 13/172,408 mailed Feb. 28, 2012, 11 pp.
Final Office Action for U.S. Appl. No. 13/172,408 mailed Aug. 10, 2012, 13 pp.
Office Action for U.S. Appl. No. 13/172,408 dated May 29, 2013, 26 pp.
Office Action for U.S. Appl. No. 11/561,485 dated Apr. 6, 2011, 11 pp.
Notice of Allowability for U.S. Appl. No. 10/029,143 mailed Sep. 22, 2003, 3 pp.
Office Action for U.S. Appl. No. 10/029,143 mailed Mar. 28, 2003, 7 pp.
Office Action for U.S. Appl. No. 10/961,775 mailed May 30, 2008, 11 pp.
Office Action for U.S. Appl. No. 12/430,373 mailed Nov. 2, 2011, 17 pp.
Office Action for U.S. Appl. No. 11/425,023 mailed Aug. 31, 2009, 12 pp.
Notice of Allowance for U.S. Appl. No. 10/190,722 mailed Jun. 29, 2004, 11 pp.
Office Action for U.S. Appl. No. 10/190,722 mailed Dec. 17, 2003, 7 pp.
Office Action for U.S. Appl. No. 10/190,722 mailed Jan. 15, 2004, 11 pp.
Office Action for U.S. Appl. No. 10/869,975 mailed Nov. 26, 2008, 11 pp.
Office Action for U.S. Appl. No. 10/869,975 mailed May 8, 2008, 12 pp.
Office Action for U.S. Appl. No. 10/869,975 mailed Nov. 19, 2007, 12 pp.
Office Action for U.S. Appl. No. 10/869,975 mailed Sep. 22, 2006, 16 pp.
Office Action for U.S. Appl. No. 11/427,164 mailed Nov. 6, 2008, 25 pp.
Office Action for U.S. Appl. No. 11/427,180 mailed Mar. 18, 2008, 14 pp.
Office Action for U.S. Appl. No. 11/427,180 mailed Jul. 10, 2007, 15 pp.
Office Action for U.S. Appl. No. 11/427,180 mailed Feb. 28, 2007, 10 pp.
Office Action for U.S. Appl. No. 11/427,180 mailed Sep. 12, 2006, 9 pp.
Office Action for U.S. Appl. No. 11/532,290 mailed May 14, 2009, 7 pp.
Office Action for U.S. Appl. No. 11/532,290 mailed Sep. 15, 2008, 7 pp.
Office Action for U.S. Appl. No. 11/532,324 mailed Sep. 22, 2010, 26 pp.
Office Action for U.S. Appl. No. 11/532,324 mailed Mar. 16, 2010, 19 pp.
Office Action for U.S. Appl. No. 11/532,324 mailed Apr. 30, 2009, 18 pp.
Office Action for U.S. Appl. No. 11/532,324 mailed Sep. 19, 2008, 7 pp.
Office Action for U.S. Appl. No. 11/671,873 mailed Apr. 4, 2011, 13 pp.
Office Action for U.S. Appl. No. 11/671,904 mailed Aug. 4, 2011, 9 pp.
Office Action for U.S. Appl. No. 10/969,687 mailed Aug. 10, 2011, 12 pp.
Office Action for U.S. Appl. No. 12/712,970 mailed Oct. 20, 2011, 6 pp.

* cited by examiner

332

| PLAYER IDENTIFIER 602 | NAME 604 | ADDRESS 606 | HOW LINKED? 608 | PARTNER IDENTIFIER? 610 | LINKED MACHINE IDENTIFIER 612 | PREFERRED GAME-RELATED IDENTITY 614 |
|---|---|---|---|---|---|---|
| P 111 111 | JOHN SMITH | 456 PLAIN ROAD, ANYTOWN, TX | TWO PLAYER CABINET | P 222 222 | N/A | HAT, DOG |
| P 222 222 | JANE SMITH | 456 PLAIN ROAD, ANYTOWN, TX | TWO PLAYER CABINET | P 111 111 | N/A | CANON |
| P 333 333 | MARK BROWN | 123 MAIN STREET, NEW YORK, NY | VIA NETWORK | P 444 444 | M 4567 | BLUE PIRATE |
| P 444 444 | JUDY GREEN | 345 CENTER AVE. CENTERVILLE, CT | VIA NETWORK | P 333 333 | M 7612 | GREEN PIRATE |
| H 555 555 | HOUSE 123 | N/A | N/A | N/A | N/A | N/A |
| H 666 666 | HOUSE 456 | N/A | N/A | N/A | N/A | N/A |

FIG. 6

334

| PLAYER IDENTIFIER 702 | FIRST ASSET 704 | SECOND ASSET 706 | THIRD ASSET 708 | FOURTH ASSET 710 |
|---|---|---|---|---|
| P 111 111 | A 1234 | A 1237 | A 1239 | A 1225 |
| P 222 222 | A 1235 | A 1238 | N/A | N/A |
| P 987 122 | A 3490 | A 3491 | A 3502 | A 3503 |
| P 324 877 | A 3495 | N/A | N/A | N/A |
| P 981 333 | A 4678 | A 4679 | N/A | N/A |

FIG. 7

338

| ASSET IDENTIFIER 802 | ASSET NAME 804 | ASSET DESCRIPTION 806 |
|---|---|---|
| A 1234 | ST. CHARLES PLACE, STATES AVENUE, VIRGINIA AVENUE | PLAYER COLLECTS DOUBLE RENT WHEN OPPONENT LANDS ON ONE OF THE PROPERTIES |
| A 1235 | PENNSYLVANIA AVENUE WITH ONE HOUSE | PLAYER COLLECTS $150 IN RENT WHEN OPPONENT LANDS ON THE PROPERTY |
| A 3490 | GOLD TREASURE CHEST | RELEASES 20 COINS WHENEVER A GOLD KEY IS OBTAINED |
| A 3491 | SILVER TREASURE CHEST | RELEASES 15 COINS WHENEVER A SILVER KEY IS OBTAINED |
| A 3495 | SILVER KEY | CAN BE USED TO OPEN ANY SILVER TREASURE CHEST |
| A 4678 | STRAIGHT WILDCARD | WILDCARD WHICH CAN ONLY BE USED TO COMPLETE A STRAIGHT. EXPIRES AFTER 25 SPINS |
| A 4679 | FLUSH WILDCARD | WILDCARD WHICH CAN ONLY BE USED TO COMPLETE A FLUSH. EXPIRES AFTER 30 SPINS |

FIG. 8

MULTIPLAYER GAMING DEVICE AND METHODS

PRIORITY APPLICATION

This application is a continuation of U.S. patent application Ser. No. 12/136,667 filed Jun. 10, 2008 and entitled "MULTIPLAYER GAMING DEVICE AND METHODS", which claims the benefit of U.S. Provisional Patent Application No. 60/943,431 entitled "GAMING PRODUCTS AND METHODS ASSOCIATED THEREWITH", filed Jun. 12, 2007. The entire content of each of these applications is incorporated herein by reference for all purposes.

RELATED APPLICATIONS

This application is related to the following U.S. patent applications and patents:

U.S. patent application Ser. No. 11/561,485 filed Nov. 20, 2006, (abandoned) which is a continuation of U.S. patent application Ser. No. 10/794,338, filed Mar. 3, 2008(abandoned) which claimed priority to U.S. Provisional Patent Application No. 60/452,163, filed Mar. 4, 2003;

U.S. patent application Ser. No. 10/842,405, filed May 10, 2004, issued as U.S. Pat. No. 7,695,358 on Apr. 13, 2010; which is a continuation in part of U.S. patent application Ser. No. 10/006,402, filed Oct. 23, 2001, issued as U.S. Pat. No. 6,733,390; which is a continuation of U.S. patent application Ser. No. 09/108,827 filed Jul. 1, 1998, issued as U.S. Pat. No. 6,312,332, which is a continuation in part of U.S. patent application Ser. No. 09/052,835, filed Mar. 31, 1998, issued as U.S. Pat. No. 6,142,872;

U.S. patent application Ser. No. 10/414,934, filed Apr. 15, 2003 (abandoned), which claimed priority to U.S. Provisional Patent Application No. 60/374,342, filed Apr. 19, 2002;

U.S. patent application Ser. Nos. 10/790,934, filed Mar. 2, 2004 issued as U.S. Pat. No. 7,871,323 on Jan. 18, 2011; 11/426,700, filed Jun. 27, 2006 (abandoned); 11/426,718, filed Jun. 27, 2006 (abandoned) 11/426,724, filed Jun. 27, 2006 (abandoned); 11/675,144, filed Feb. 15, 2007 issued as U.S. Pat. No. 8,047,909 on Nov. 1, 2011; and 11/680,969, filed Mar. 1, 2007 (abandoned) all claim priority to the '934 application;

U.S. patent application Ser. No. 10/254,831, filed Sep. 25, 2002 (abandoned), which claimed priority to U.S. Provisional Application No. 60/324,572, filed Sep. 25, 2001;

U.S. patent application Ser. Nos. 11/422,776, filed Jun. 7, 2006 (abandoned); 11/422,778, filed Jun. 7, 2006, issued as U.S. Pat. No. 7,387,571 on Jun. 17, 2008, 11/422,784, filed Jun. 7, 2006 (pending); 11/671,873, filed Feb. 6, 2007 (pending); 11/671,904, filed Feb. 6, 2007 (pending); previously mentioned 11/675,144, filed Feb. 15, 2007, issued as U.S. Pat. No. 8,047,909 on Nov. 1, 2011; and previously mentioned 11/680,969, filed Mar. 1, 2007 (abandoned) all claim priority to the '831 application;

U.S. patent application Ser. No. 09/793,020, filed Feb. 26, 2001, issued as U.S. Pat. No. 6,503,146, which is a continuation of U.S. patent application Ser. No. 09/152,402, filed Sep. 14, 1998, issued as U.S. Pat. No. 6,206,782;

U.S. patent application Ser. Nos. 10/190,722 filed Jul. 5, 2002 (abandoned); 10/869,975, filed Jun. 17, 2004 (abandoned); 11/427,131 filed Jun. 28, 2006 issued as U.S. Pat. No. 7,637,811 on Dec. 29, 2009; 11/427,164, filed Jun. 28, 2006 (abandoned); 11/427,180, filed Jun. 28, 2006 (abandoned); 11/567,635, filed Dec. 6, 2006 (pending); and 11/567,648 filed Dec. 6, 2006 (abandoned) all claim priority to the '782 patent.

U.S. patent application Ser. No. 09/590,021, filed Jun. 8, 2000, issued as U.S. Pat. No. 6,361,441, which is a continuation of the previously mentioned '872 patent;

U.S. patent application Ser. Nos. 10/067,576, filed Feb. 6, 2002, issued as U.S. Pat. No. 6,712,699; 10/811,583 filed Mar. 29, 2004 issued as U.S. Pat. No. 7,364,510 on Apr. 29, 2008; 10/869,975, filed Jun. 17, 2004 (abandoned); 11/427,131, filed Jun. 28, 2006 issued as U.S. Pat. No. 7,637,811 on Dec. 29, 2009; 11/427,164, filed Jun. 28, 2006 (abandoned); 11/427,180, filed Jun. 28, 2006 (abandoned); 11/532,290, filed Sep. 15, 2006 (abandoned); 11/532,313 filed Sep. 15, 2006; 11/532,324, filed Sep. 15, 2006 (abandoned); previously mentioned 11/561,485, filed Nov. 20, 2006 (pending); 11/567,635, filed Dec. 6, 2006 (pending); 11/567,648, filed Dec. 6, 2006 (abandoned); 11/671,873, filed Feb. 6, 2007 (pending); 11/671,904, filed Feb. 6, 2007 (pending); 11/675,144, filed Feb. 15, 2007 issued as U.S. Pat. No. 8,047,909 on Nov. 1, 2011; and 11/680,969, filed Mar. 1, 2007 (abandoned) all claim priority to the '021 application.

Each of the related applications and patents is incorporated by reference in its entirety.

FIELD OF THE INVENTION

The present disclosure relates to gaming and gaming devices. More specifically, the present disclosure relates to games and gaming devices involving multiple players.

BRIEF DESCRIPTION OF THE DRAWINGS

FIG. 6 is a table illustrating an example data structure of a player database for use in some embodiments of the present disclosure.

FIG. 7 is a table illustrating an example data structure of a session database for use in some embodiments of the present disclosure.

FIG. 8 is a table illustrating an example data structure of a asset database for use in some embodiments of the present disclosure.

DETAILED DESCRIPTION OF EMBODIMENTS OF THE INVENTION

Figure 1:
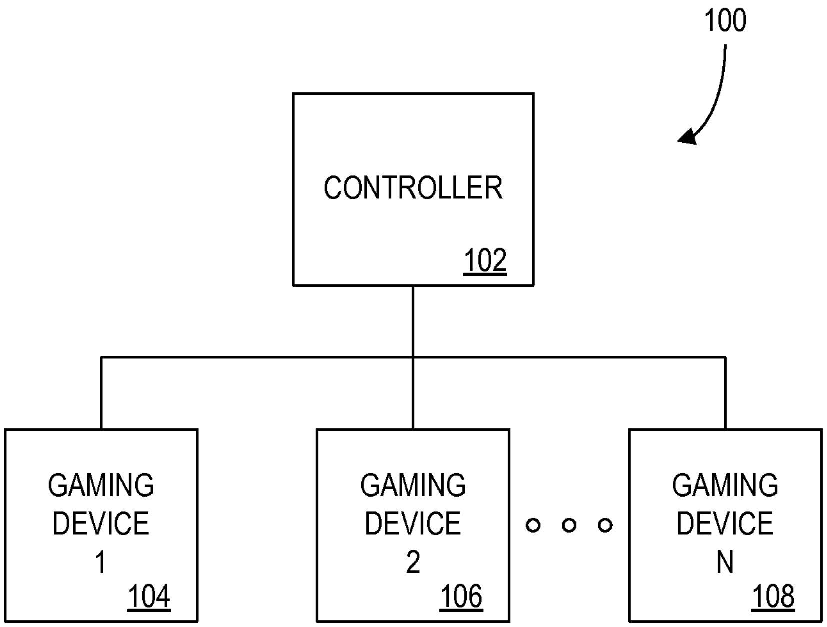
FIG. 1 is a block diagram illustrating an example system according to some embodiments of the present disclosure.

The present disclosure describes a plurality of gaming devices that allow multiplayer play. In particular, each gaming device may allow wagers at a first level for single player play, and increased wagers to allow multiplayer play. The increased wager amounts are used to fund prizes associated with multiplayer play that may be in addition to any prizes that are provided from single player play. In an exemplary embodiment, two players on two gaming devices must each provide a heightened wager indicative of multiplayer play before either player is eligible to win a multiplayer game prize. In various embodiments, the multiplayer game play is defined by taking the better of the two player's respective outcomes, combining the two outcomes into one hyper or ultra outcome, or other multiplayer game as desired. In some embodiments, players may be allowed to swap symbols. Many concepts of multiplayer play have been described in the related applications. An overview of some of the salient points is provided below with respect to FIGS. 1-9B. The discussion of the embodiments which form the focus of the present disclosure begin with reference to FIG. 10.

In the following description, reference is made to the accompanying drawings that form a part hereof, and in which is shown, by way of illustration, specific embodiments in which the disclosure may be practiced. These embodiments are described in sufficient detail to enable those skilled in the art to practice the embodiments, and it is to be understood that other embodiments may be utilized and that structural, logical, software, hardware, and electrical changes may be made without departing from the scope of the present disclosure. The following description is, therefore, not to be taken in a limited sense, and the scope of the present disclosure is defined by the appended claims.

A. TERMS

Throughout the description that follows and unless otherwise specified, the following terms may include and/or encompass the example meanings provided in this section. These terms and illustrative example meanings are provided to clarify the language selected to describe embodiments of the disclosure both in the specification and in the appended claims.

The term "controller" may refer to an electronic device (e.g., a computer) that communicates with one or more gaming devices. In a manner known in the art, the controller may be embodied as a computer server and may (i) control the actions of gaming devices and/or (ii) receive and store information associated with the gaming devices. For example, the controller may employ one or more databases to record gaming device statistics such as e.g., coin-in, coin-out, jackpot information, theoretical wins, etc.

The term "game" may refer to a gambling event with a beginning and end that may encompass a number of outcomes (such as reel spins or hands of video poker) or span of time. The end of the game may be determined voluntarily (in which the player elects to stop play) or involuntarily (in which the gaming device terminates play).

The term "primary game" may refer to a gambling event (i.e., one or more chance-based event(s) executed in exchange for player consideration and yielding a potential prize) yielding a spin result. In accordance with the present disclosure, a primary game may be embodied as a reel-based slot machine game. Termination of the game may be established voluntarily (e.g., where a player elects to stop play) or involuntarily (e.g., where the gaming device terminates play based on the occurrence of a termination event).

The term "secondary game" may refer to a game employed by a gaming device characterized by an objective that is dependent on results achieved in a primary game. For example, a secondary game in accordance with the present disclosure may require a player to acquire game pieces throughout the course of playing a primary game or primary game session. The object of a secondary game may be referred to as a secondary game objective or overall game objective.

The term "game character" may refer to a character, which may be a cartoon and/or digitally generated, which is involved in the game playing experience. The character may entertain the player, explain payouts, try to steal objects from the player, try to defend objects held by the player, and the like. The character could be a life-like animation of a television character, or even just the audio associated with a well-known character.

The term "game money" may refer to non-cash value game currency for use during a gaming session. In some embodiments, an amount of game money may translate to a payout.

The term "outcome" may generally refer to the result of game, such as cherry-cherry-cherry in a slot machine game, a push in blackjack, a flush in video poker, the completion of a puzzle, the attainment of a goal, etc. Different types of gaming devices may have widely varying types of outcomes. Several are described in detail herein and still others will be apparent to those of skill in the art based on the present disclosure.

The term "spin result" may refer to an outcome that is the result of a player executing a given spin or handle pull. In accordance with the present disclosure, the spin result may be expressed in a number of ways. More specifically, the spin result may be expressed as a value (e.g., $5.00), as a factor based on which a value may be determined (e.g., 2× wager amount), or in any other suitable manner. In accordance with some embodiments of the disclosure, the spin result may be communicated graphically, as a series of discreet symbols appearing on a first game area of the gaming device. Further, as mentioned above, the spin result and any corresponding prize or payout may be generated or determined randomly or through a combination of randomness and player skill. A spin result may include a subset of symbols selected from among a larger set of symbols. For example, the spin result "BAR-CHERRY-LEMON" may be a spin result determined from the symbol set "ORANGE, CHERRY, 7, BAR, LEMON, APPLE, PLUM, GRAPE, and PEAR."

The term "symbol" may refer to any graphic or other indicia that appear on the reels of a gaming device, or in any game area of a gaming device, or on the display of another device that may represent an outcome or a portion thereof. Symbols may include for example an image of a piece of fruit and may be represented herein using text as in, for example, "CHERRY." Typically the value of a symbol or a group of symbols is defined by a pay table. In some embodiments, symbols may include game pieces. Symbol is also defined to include the indicia associated with a playing card such as are used in video poker games. Thus, for example, a K♠ card is a symbol.

The term "game piece" may refer to an element of a secondary game that may occur in a primary game and then may be applied to achieving an overall game objective. For example, in a three-legged race secondary game, a "RIGHT STEP" game piece that appears as a symbol on a primary game reel may be used help players advance their racer along a track. In some embodiments however, the occurrence of a particular game piece may detract from achieving an objective. For example, if in the three-legged race secondary game a "RIGHT STEP" game piece appears repeatedly in the primary game (i.e., without a partner getting a "LEFT STEP" game piece), the player's racer may waste time turning in circles instead of advancing down the track.

The terms "secondary game result" and "cumulative outcome" shall be synonymous and may refer to an indication of a players' progress toward completing a defined objective. In accordance with the present disclosure, a game result may be expressed in a number of ways including e.g., a percentage of completion (e.g., 80% complete), a completion ratio (e.g., 15 of 28 steps completed), a collection of game pieces combined together to complete an objective, etc. In some embodiments, a cumulative outcome may be determined and displayed as play progresses and be modified as players advance toward (or regress from) completing their objective. Thus, during play, a cumulative outcome may be continually changing.

The term "gaming device" may refer to any electrical, mechanical, or electro-mechanical device operative to: accept wagers; execute a process to determine a spin result; based on the spin result, determine progress toward a game result; determine an game result, and provide entitlement to a prize based on (i) the spin result, (ii) the game result, or (iii) both (i) and (ii). The spin result may be generated or determined randomly (e.g., as with a slot machine) or through a combination of randomness and player skill (e.g., as with video poker). In accordance with the present disclosure, gaming devices may include slot machines (both video reel and mechanical reel), video poker machines, video blackjack machines, video roulette machines, video keno machines, video bingo machines, pachinko machines, video lottery terminals, hand held gaming devices, and the like. Gaming devices also include multiplayer gaming devices, two-player cabinet machines, and slot machines built for two (or more).

The term "multiplayer gaming device" may refer to a gaming device comprising two or more player controls, seats, primary and/or secondary display screens, credit input/output devices, as well as one or more shared primary and/or secondary display screens, controls, etc. In some embodiments, a multiplayer gaming device may comprise one or more single player gaming devices operatively connected to another single-player gaming device or to a controller.

The terms "spin" and "handle pull" shall be synonymous and may refer to an occurrence of the determination of a spin result. In accordance with the present disclosure, a spin yields a spin result that may be communicated to a player via a first game area of the gaming device. One or more spin result(s) may then be used to determine a secondary game result (i.e., an indication of progress toward an objective), which may be indicated to a player via a second game area of the gaming device. A player may initiate a spin by depositing currency or establishing credit with the gaming device and subsequently actuating a lever or designated button.

The term "payout" may refer to the actual prize, reward, winnings, or funds associated with a particular spin result and/or game result. Typically, the payout may be embodied as cash and/or credit dispensed or otherwise made available to the gaming device player. Alternatively, a payout may be embodied as goods or services to which the player may be entitled.

The term "peripheral device" may refer to a device operatively in communication with a gaming device and that is configured to assist in the operation of game-related functions.

The term "player tracking card" may refer to a means by which a casino owner or operator may identify an individual gaming device player and monitor and record certain information associated with the player. Typically, a player tracking card may be embodied as a plastic card bearing identifying indicia or encoded information via which the controller and/or gaming device may identify the player. Generally, the identifying information is used as an index to one or more database record(s), which store information associated with e.g., the demographics of the player and historical information associated with past play (if any).

The term "prepaid session" may refer to a duration of time or number of spins that are paid for in advance and subsequently utilized by the player. In accordance with some embodiments of the disclosure, the player may purchase (i.e., wager upon) a plurality of spins, following execution of which a game result may be determined and any resultant payout conferred to the player.

The terms "primary game area," "first game area," "main game area," and "lower game area" shall be synonymous and may refer to an area of the gaming machine's façade via which a player may be informed of a spin result. The first game area may include any number of appropriate output devices and/or display devices including a screen, audio output, mechanical reels and/or electronic representations of reels, etc.

The term "primary game screen" may refer to a screen used as the primary game area.

The terms "secondary game area," "second game area," "upper game area," and "alternate game area" shall be synonymous and may refer to an area of the gaming machine's façade via which a player may be informed of a game result and/or a level of progress toward achieving an overall or secondary game objective. In accordance with some embodiments, the second game area may include one or more dedicated output devices and/or display devices for displaying or otherwise indicating progress toward a game result or game objective.

The term "secondary game screen" may refer to a screen used as the secondary game area.

The term "termination event" may refer to one or more criteria that when satisfied instruct a gaming device and/or controller to evaluate a level of progress toward a secondary game objective having been achieved at a gaming device. For example, a termination event in accordance with the present disclosure may comprise the completion of a given number of spins, an elapsed duration of time (e.g., the end of a prepaid gaming session), and/or a particular spin result. In some embodiments, a termination event may comprise the completion of the secondary game objective. In some embodiments with team competitions, a competing team achieving a secondary game objective could result in a termination event for other competing teams.

B. SYSTEM

Turning to FIG. 1, the present disclosure can be configured to function as a system 100 in a network environment including a controller 102 (e.g., a slot server of a casino) that is in communication, via a communications network, with one or more gaming devices 104, 106, 108 (e.g., slot machines, video poker machines, multiplayer gaming devices).

The controller 102 may communicate with the gaming device(s) 104, 106, 108 directly or indirectly, via a wired or wireless medium such as the Internet, LAN, WAN or Ethernet, Token Ring, or via any appropriate communications means or combination of communications means.

Each of the gaming devices 104, 106, 108 may comprise computers, such as those based on the Intel® Pentium® processor, that are adapted to communicate with the controller 102. Any number and type of devices may be in communication with the controller 102.

Communication between the devices (including the gaming devices 104, 106, 108) and the controller 102, and among the devices, may be direct or indirect, such as over the Internet through a web site maintained by controller 102 (e.g., where the controller hosts an on-line or virtual casino), on a remote server and/or over an on-line data network. Such data networks may include commercial on-line service providers, bulletin board systems and the like. In accordance with yet other embodiments, the devices may communicate with one another and/or the controller 102 via radio frequency (RF), cable TV, satellite links and the like.

Some, but not all, possible communication networks that may comprise the network or be otherwise part of the system include: a local area network (LAN), a wide area network (WAN), the Internet, a telephone line, a cable line, a radio channel, an optical communications line, and a satellite communications link.

Possible communications protocols that may be part of the system include: Ethernet (or IEEE 802.3), SAP, ATP, Bluetooth™, and TCP/IP. Communication may be encrypted to ensure privacy and prevent fraud in any of a variety of ways known in the art (e.g., using hash functions or public/private key systems).

Those skilled in the art will understand that devices in communication with each other need not be continually transmitting to each other. On the contrary, such devices need only transmit to each other periodically or as necessary, and may actually refrain from exchanging data most of the time. For example, a device in communication with another device via the Internet may not transmit data to the other device for weeks at a time.

In accordance with some embodiments, a controller 102 (e.g., a server computer) may not be necessary and/or preferred. For example, the present disclosure may, in one or more embodiments, be practiced on a stand-alone gaming device 104 and/or a gaming device 104 in communication only with one or more other gaming devices 106, 108 and/or a controller 102. In such an embodiment, any function(s) described as being performed by the controller 102 or data described as stored at the controller 102 may instead be performed by or stored at one or more gaming devices 104.

Figure 2:
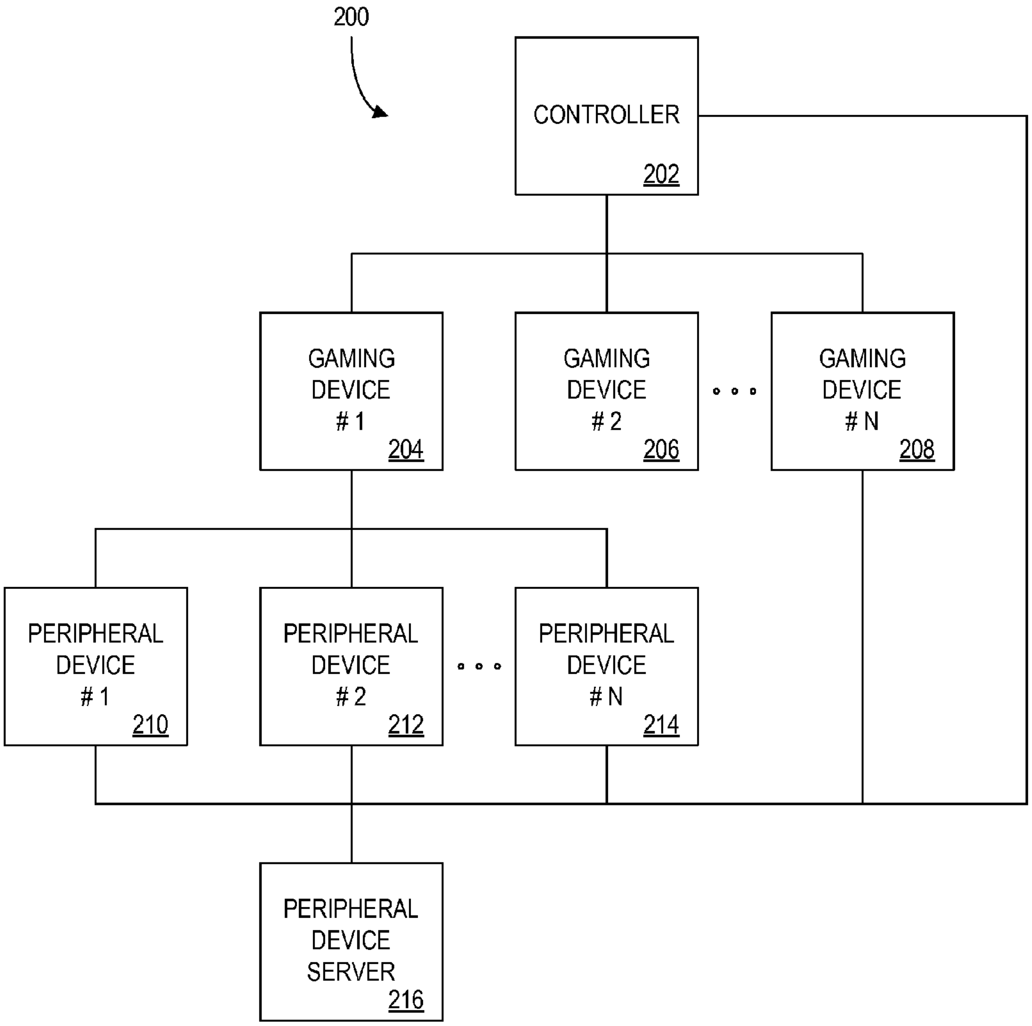
FIG. 2 is a block diagram illustrating an example alternative system according to some embodiments of the present disclosure.

Turning to FIG. 2, an alternative system 200 according to at least one embodiment of the present disclosure may include a controller 202 (e.g., a slot server of a casino) that is in communication, via a communications network, with one or more gaming devices 204, 206, 208 (e.g., slot machines, video poker machines). A differentiating characteristic between the aforementioned system 100 and the alternative system 200 being that in the present system 200 at least one gaming device 204 is also in communication with one or more peripheral devices 210, 212, 214.

A peripheral device 210, 212, 214 may, in turn, be in communication with a peripheral device server 216 and, in some embodiments, with the controller 202. In one or more embodiments the peripheral device server 216 may be in communication with one or more gaming devices 208 and/or the controller 202.

The controller 202 may communicate with the devices (including the gaming devices 204, 206, 208) and peripherals 210, 212, 214, 216 directly or indirectly, via a wired or wireless medium such as the Internet, LAN, WAN or Ethernet, Token Ring, or via any appropriate communications means or combination of communications means. For example, the controller 202 may communicate directly with one of the gaming devices 204 (e.g., via a LAN) and indirectly (e.g., via a gaming device 204) with a peripheral device 210. In accordance with another example embodiment, the controller 202 may communicate with one of the gaming devices 206 via a LAN and with another of the gaming devices 208 via the Internet (e.g., if the particular gaming device 208 comprises a personal computer in communication with an online casino).

Each of the devices (including the gaming devices 204, 206, 208 and peripherals 210, 212, 214, 216) may comprise one or more computer(s), such as those based on the Intel® Pentium® processor, that are adapted to communicate with the controller 202. Further, each of the devices may comprise a gaming device such as an electronic, mechanical or electro-mechanical slot machine, video poker machine, video blackjack machine, video keno machine, pachinko machine, video roulette machine, and/or a lottery terminal. Further yet, each of the devices may comprise an external or internal module associated with one or more of the gaming devices 204, 206, 208 that is capable of communicating with one or more of the gaming devices 204, 206, 208 and of directing one or more gaming devices 204, 206, 208 to perform one or more functions. Any number of devices may be in communication with the controller 202. Any number and type of peripheral devices 210, 212, 214 may be in communication with a gaming device 204, peripheral device server 216 and/or the controller 202.

Communication between the devices and the controller 202, between the devices themselves, between the peripheral device server 216 and the devices, and between the peripheral device server 216 and the controller 202, may be direct or indirect. Such communications may include those such as over the Internet through a web site maintained by the controller 202, on a remote server or over an on-line data network. Such data networks may include commercial on-line service providers, bulletin board systems and the like. In yet other embodiments, any and all of the devices of the system 200 (i.e., the devices (including the gaming devices 204, 206, 208 and peripherals 210, 212, 214), the controller 202, and the peripheral device server 216) may communicate with one another over RF, cable TV, satellite links and the like.

Some, but not all, possible communication networks that may comprise the network or otherwise be part of the system include: a local area network (LAN), a wide area network (WAN), the Internet, a telephone line, a cable line, a radio channel, an optical communications line, a satellite communications link.

Possible communications protocols that may be employed by the system include: Ethernet (or IEEE 802.3), SAP, ATP, Bluetooth™, and TCP/IP among others. Such communications may be encrypted or otherwise encoded to ensure privacy and prevent fraud in any of a variety of ways known in the art (e.g., using hash functions and/or public/private key systems).

In some embodiments, the controller 202 may not be necessary and/or preferred. For example, the present disclosure may, in one or more embodiments, be practiced on a stand-alone gaming device 204, on one or more gaming devices 204 in communication with one or more peripheral devices 210, on one or more gaming devices 208 in communication with a peripheral device server 216, on one or more peripheral devices 214 in communication with a peripheral device server 216, and/or on a gaming device 206 in communication only with one or more other gaming devices 208. In such embodiments, any functions described as performed by the controller 202 or data described as stored in the memory of the controller 202 may instead be performed by or stored on one or more gaming device(s) 204, 206, 208, one or more peripheral device(s) 210, 212, 214, and/or peripheral device server(s) 216.

Similarly, a peripheral device server 216 may not be desired and/or needed in some embodiments of the present disclosure. In such embodiments that do not involve a peripheral device server 216, any or all of the functions described herein as being performed by a peripheral device server 216 may instead be performed by the controller 202, one or more gaming devices 204, 206, 208, one or more peripheral devices 210, 212, 214, or a combination thereof.

Similarly, in embodiments that do not involve a peripheral device server 216 any data described herein as being stored in a memory of a peripheral device server 216 may instead be stored in a memory of another server computer (e.g., the controller 202), one or more gaming devices 204, 206, 208, one or more peripheral devices 210, 212, 214, or a combination thereof.

Any or all of the gaming devices 204, 206, 208 may, respectively, include or be in communication with a peripheral device 210, 212, 214. A peripheral device 210 may be a device that receives information from (and/or transmits information to) one or more gaming devices 204, 206, 208. For example, a peripheral device 210 may be operable to receive information about games being played on a gaming device 204, such as the initiation of a game, a random number that has been generated for a game, the result or outcome of a handle pull, spin or gaming session at the gaming device, etc.

In one or more embodiments, one or more such peripheral devices 210 may be in communication with a peripheral device server 216. This enables the peripheral device server 216 to receive information regarding a plurality of games being played on a plurality of gaming devices 204, 206, 208. The peripheral device server 216, in turn, may be in communication with the controller 202. It should be understood that any functions described herein as performed by a peripheral device 210 may also or instead be performed by the peripheral device server 216.

Similarly, any data described herein as being stored on or accessed by a peripheral device 210 may also or instead be stored on or accessed by the peripheral device server 216. A peripheral device 210 may be operable to access a database (e.g., of a peripheral device server 216) to provide benefits (e.g., cashless gaming receipts) based on, for example, an outcome of a game and or a gaming session at the gaming device 204.

The peripheral device server 216 may also monitor player gambling history over time by associating gambling behavior with player identifiers, such as player tracking card numbers. For example, information about the player obtained or accessed by a peripheral device server 216 may be analyzed, e.g., to identify those players that a particular gaming machine owner, operator, or manufacturer finds most desirable. Based upon desired objectives, the peripheral device server 216 may direct the appropriate peripheral device 210 to issue customized messages, images, offers, and games to specific players.

Information received by a peripheral device 210 from a gaming device 204 may include gambling data such as number of games initiated per unit of time, outcomes displayed for games initiated, payouts corresponding to outcomes displayed, a credit meter balance of the gaming device, and/or data associated with the player currently playing the gaming device.

The functions described herein as being performed by a peripheral device server 216 and/or a peripheral device 210 may, in one or more embodiments, be performed by the controller 202 (e.g., in lieu of (or in conjunction with) being performed by a peripheral device server 216 and/or a peripheral device 210).

In one or more embodiments, a peripheral device 210 may be useful for implementing the embodiments of the present disclosure into the operation of a gaming device 204. For example, in order to avoid or minimize the necessity of modifying or replacing a program already stored in a memory of a conventional gaming device 204, an external or internal module that comprises a peripheral device 210 may be added to, coupled to, or otherwise associated with the gaming device 204.

Thus, for example, a peripheral device 210 may be utilized to monitor play of the gaming device 204 and display or output messages, images, image portions and/or an overall outcome of a game. In such embodiments the gaming device 204 with which the peripheral device 210 is in communication may continue to operate. In such embodiments the gaming device 204 may output an outcome for each spin or handle pull and overall game progress (e.g., the completion of a puzzle) may be indicated or output by the peripheral device 210. The peripheral device 210 may further output a secondary game outcome or secondary game payout when appropriate.

The peripheral device 210 may also output messages to the player. For example, the peripheral device 210 may be embodied as a player tracking system including a screen for outputting messages and/or game status information to the player.

The peripheral device may also provide benefits to a player (e.g., coins, tokens, electronic credits, paper receipts exchangeable for cash, services, and/or merchandise).

Accordingly, a peripheral device 210 may include (i) a communications port (e.g., for communicating with one or more gaming devices 204, peripheral device server 216, another peripheral device 212, and/or a computer); (ii) a display (e.g., for displaying messages and/or outcomes and payouts), (iii) another output means (e.g., a speaker, light, or other device for communicating with a player), and/or (iv) a benefit providing means (e.g., a printer and paper dispensing means, a credit meter, and/or a hopper and hopper controller).

In one or more embodiments, the peripheral device 210 may not output outcomes and/or messages to a player but may instead direct the processor of a gaming device 204 to perform such functions. For example, a program stored in a memory of peripheral device 210 may cause a processor of a gaming device 204 to perform certain functions. More specifically, a program stored in a memory of peripheral device 210 may cause a processor of a gaming device 204 to output an outcome, determine an outcome, output a message, access a database, provide a benefit, refrain from providing a benefit (e.g., by not sending a signal to a hopper controller of the gaming device 204 not to dispense tokens when it otherwise normally would), and/or communicate with another device.

Examples of peripheral devices 210 include e.g., (i) electronic apparatuses "retrofitted" to conventional gaming devices 204 so that inventive processes disclosed herein may be realized through game play at the gaming device 204, (ii) Personal Digital Assistants (PDAs) such as those manufactured by Palm, Inc., (iii) lap top computers, (iv) cellular telephones, (v) pagers, and/or (vi) any appropriate combination thereof.

C. DEVICES

Figure 3:
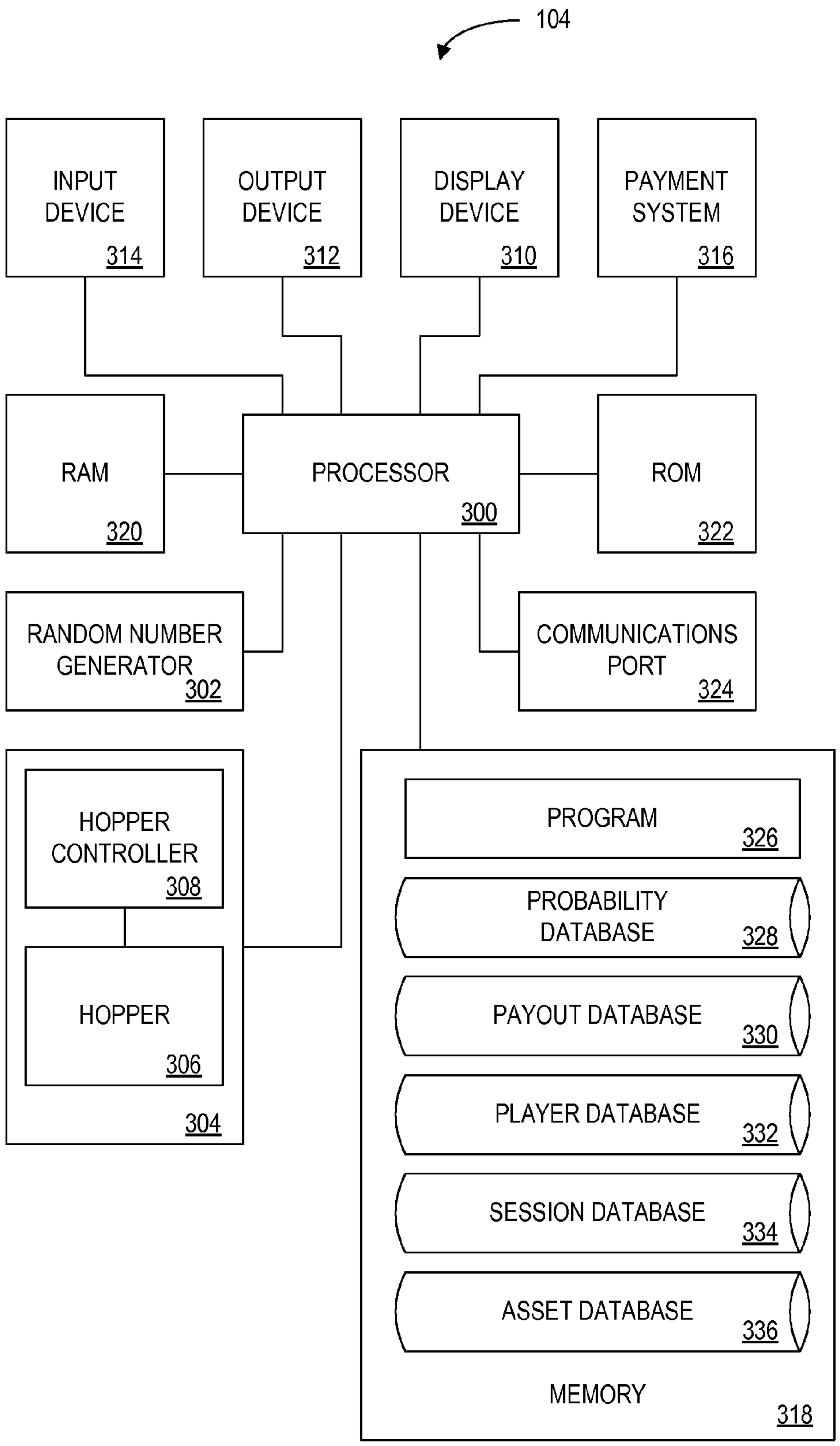
FIG. 3 is a block diagram illustrating an example gaming device according to some embodiments of the present disclosure.

Turning to FIG. 3, in accordance with the present disclosure, a gaming device 104/204 may be implemented as a system controller, a dedicated hardware circuit, an appropriately programmed general-purpose computer, or any other equivalent electronic, mechanical or electro-mechanical device. (Note that from this point forward, each reference to a "gaming device" followed by the reference numeral 104 is intended to be equivalent to a reference to any of the gaming devices from either system 100 or system 200.)

The gaming device 104 may comprise, for example, a slot machine, a video poker machine, a video blackjack machine, a video keno machine, a video lottery machine, a pachinko machine or a tabletop game.

In various embodiments, a gaming device 104 may comprise, for example, a personal computer (e.g., which communicates with an online casino via a Web site), a telephone (e.g., to communicate with one or more remote gaming services), or a portable handheld gaming device (e.g., a PDA). Portable devices of this nature are sometimes referred to herein as a mobile terminal. The gaming device 104 may comprise any or all of the gaming devices of the aforementioned systems.

In some embodiments, a user device such as a PDA or cell phone may be used in place of, in combination with, or in addition to, some or all of the gaming device components. In one or more embodiments, the gaming device 104 may comprise a computing device operable to execute software that simulates play of a reeled slot machine game, video poker game, video blackjack game, video keno game, video roulette game, and/or lottery game.

The gaming device 104 disclosed herein comprises a processor 300, such as one or more Intel® Pentium® processors. The processor 300 is in operative communication with at least one random (or pseudo-random) number generator 302, which may be a component of the gaming device 104.

The random number generator 302, in accordance with at least one embodiment of the present disclosure, may generate data representing random or pseudo-random values (referred to as "random numbers" herein). The random number generator 302 may generate a random number every predetermined unit of time (e.g., every thousandth of a second) or in response to an initiation of a game on the gaming device 104. In the former embodiment, the generated random numbers may be used as they are generated (e.g., the random number generated at substantially the time of game initiation is used for that game) and/or stored for future use.

A random number generated by the random number generator 302 may be used by the processor 300 to determine, for example, at least one of an outcome, a reel position, an arrangement of symbols and a payout. A random number generator 302, as used herein, may be embodied as a secondary (e.g., tamper-evident) processor separate from but working in cooperation with a primary gaming device processor 300.

Alternatively, the random number generator 302 may be embodied as an algorithm, program component, or software stored in the memory of the gaming device and used to generate a random number.

Note that, although the generation or obtainment of a random number is described herein as involving a random number generator 302 of a gaming device 104, other methods of determining a random number may be employed. For example, a gaming device owner or operator may obtain sets of random numbers that have been generated by another entity. For example, HotBits™ is a service that provides random numbers that have been generated by timing successive pairs of radioactive decays detected by a Geiger-Muller tube interfaced to a computer. Various methods and devices for generating and using random numbers for gambling purposes will be apparent to one of skill in the art.

The processor 300 may further be operable to communicate with a benefit output device 304, which may be a component of gaming device 104. For example, the benefit output device 304 may comprise one or more devices for outputting a benefit to a player of the gaming device 104. In accordance with some embodiments, the gaming device 104 may provide coins and/or tokens as a benefit (e.g., a spin payout or a game payout). In accordance with such an embodiment the benefit output device 304 may comprise a hopper 306 coupled to a hopper controller 306, for dispensing e.g., coins and/or tokens into a coin tray of the gaming device.

In another example, the gaming device 104 may provide a receipt or other document on which there is printed an indication of a benefit (e.g., a cashless gaming receipt that has printed thereon an indication of a monetary value, which is redeemable for cash in the amount of the monetary value). In accordance with such an embodiment, the benefit output device 304 may comprise a printing and document dispensing mechanism or ticket-in/ticket-out device (not pictured).

According to yet another embodiment, the gaming device may provide electronic credits as a benefit (which, e.g., may be subsequently converted to coins and/or tokens and dispensed from a hopper into a coin tray). In such an embodiment the benefit output device 304 may comprise or include a credit meter balance and/or a processor that manages the amount of electronic credits that is indicated on a display of a credit meter balance.

In accordance with another embodiment, the gaming device 104 may credit a monetary amount to a financial account associated with a player. The financial account may be, for example, a credit card account, a debit account, a charge account, a checking account, and/or a casino account. In such an embodiment the benefit output device 304 may comprise a device for communicating with a server on which the financial account is maintained.

Note that, in one or more embodiments, the gaming device 104 may include more than one benefit output device 304. For example, the gaming device may include both a hopper 306 and hopper controller 308 combination and a credit meter balance (not pictured). Accordingly, the gaming device 104 of the present disclosure may be operable to provide more than one type of benefit to a player of the gaming device 104.

Alternatively, a single benefit output device 304 may be operable to output more than one type of benefit. For example, a benefit output device 304 may be operable to increase the balance of credits in a credit meter and communicate with a remote device in order to increase the balance of a financial account associated with a player.

The processor is also operable to communicate with a display device 310, which may be a component of the gaming device 104. The display device 310 may comprise, for example, one or more display screens or areas for outputting information related to game play on the gaming device. For example, the display device 310 may comprise or include a cathode ray tube (CRT) monitor, liquid crystal display (LCD) screen, or light emitting diode (LED) screen. In one or more embodiments, a gaming device 104 may comprise more than one display device 310. For example, a gaming device 104 may comprise a first game area having an LCD display for displaying electronic representations of reels and a second game area comprising a second LCD for displaying broader game objective information (e.g., various image portions having been secured by the player).

A display device 310 may comprise, for example, one or more display areas. For example, one of the display areas may display outcomes of spins or handle pulls played on the gaming device (e.g., on electronic reels of a gaming device). A second display area may display information associated with a player's progress toward a broader game objective. A third display area may display e.g., the benefits obtainable by playing a game of the gaming device (e.g., in the form of a payout table). In one or more embodiments, the gaming device 104 may include more than one display device 310, one or more other output devices 312, or a combination thereof (e.g., an upper game area, a lower game area, a credit meter, and left and right audio speakers).

As suggested above, the processor 300 may also be in communication with one or more other devices besides the display device, for outputting information (e.g., to a player or another device). Such other output devices 312 may also be components of the gaming device 104 of the present disclosure. Such devices 312 may comprise, for example, an audio speaker (e.g., for outputting an outcome or information related thereto, in addition to or in lieu of such information being output via a display device 310), an infra-red transmitter, a radio transmitter, an electric motor, a printer (e.g., such as for printing cashless gaming vouchers), a coupon or product dispenser, an infra-red port (e.g., for communicating with a second gaming device 106 or a portable device of a player), a Braille computer monitor, and a coin or bill dispenser.

For gaming devices 104, common output devices 312 include a cathode ray tube (CRT) monitor on a video poker machine, a bell on a gaming device 104 (e.g., rings when a player wins), an LED display of a player's credit balance on a gaming device 104, an LCD display of a personal digital assistant (PDA) for displaying keno numbers, etc.

The processor 300 may also be in communication with an input device 314, which is a device that is capable of receiving an input (e.g., from a player or another device) and which may be a component of gaming device 104. An input device 314 may communicate with or be part of another device (e.g., a server, a gaming device, etc.).

Exemplary input devices 314 include: a bar-code scanner, a magnetic stripe reader, a computer keyboard or keypad, a button, a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, and an infrared port (e.g., for receiving communications from a second gaming device or from a another device such as a smart card or PDA of a player).

With respect to the gaming device 104 of the present disclosure, additional or alternative input devices 314 may include one or more button(s) or touch-screen(s) (e.g., on a slot machine), a lever or handle connected to the gaming device, a magnetic stripe reader (e.g., to read a player tracking card inserted into a gaming device), a touch-screen for input of player selections during game play, and a coin and bill acceptor.

The processor 300 may also be in communication with a payment system 316, which may be a component of the gaming device 104. The payment system 316 may be a device capable of accepting payment from a player (e.g., a bet or establishment of a balance) and/or providing payment to a player (e.g., a spin payout and/or a game payout). Payment may not be limited to money, but may also include other types of consideration, including products, services, and alternate currencies. Exemplary methods of accepting payment by the payment system 316 include (i) receiving currency (i.e., coins, tokens or bills). Accordingly, the payment system 316 may comprise a coin or bill acceptor.

In accordance with other embodiments of the disclosure, the payment system 316 may receive payment via an alternate currency (e.g., a paper cashless gaming voucher, a coupon, a non-negotiable token). Accordingly the payment system 316 may comprise a bar code reader or other sensing means. In some embodiments, a payment system 316 may operate to receive a payment identifier (e.g., a credit card number, a debit card number, player tracking card number, etc.) and to debit an account identified by the payment identifier.

The processor is additionally in communication with a memory and a communications port 324 (e.g., for communicating with one or more other devices). The memory may comprise any appropriate combination of magnetic, optical and/or semiconductor memory, and may include, for example, Random Access Memory (RAM) 320, Read-Only Memory (ROM) 322, a compact disc and/or a hard disk 318. That is, the memory may comprise or include any type of computer-readable medium. The processor 300 and the memory may each be, for example: (i) located entirely within a single computer or other device; or (ii) connected to each other by a remote communication medium, such as a serial port cable, telephone line or radio frequency transceiver. In one embodiment, the gaming device 104 may comprise one or more devices that are connected to a remote server computer for maintaining databases.

The memory stores a program 326 for controlling the processor 300. The processor 300 performs instructions of the program 326, and thereby operates in accordance with the present disclosure, and particularly in accordance with the methods described in detail herein.

The program 326 may be stored in a compressed, uncompiled and/or encrypted format. The program 326 furthermore includes program elements that may be necessary, such as an operating system, a database management system and "device drivers" for allowing the processor 300 to interface with computer peripheral devices. Appropriate program elements are known to those skilled in the art, and need not be described in detail herein.

The terms "computer-readable medium" and "computer-readable media" as used herein are synonymous and may refer to any medium that stores and/or participates in providing instructions to the processor 300 of the gaming device 104 (or any other processor of a device described herein) for execution. Such a medium may take many forms, including but not limited to, non-volatile media, volatile media, and transmission media. Exemplary non-volatile media include e.g., optical or magnetic disks, such as compact discs (CDs), Digital Versatile Discs (DVDs), etc. Exemplary volatile media may include dynamic random access memory (DRAM), which typically constitutes the main memory. Transmission media include coaxial cables, copper wire and fiber optics, including wires comprising a system bus coupled to the processor. Transmission media may carry acoustic or light waves, such as those generated during radio frequency (RF) and infrared (IR) data communications.

Exemplary forms of computer-readable media include, for example, a floppy disk, a flexible disk, hard disk, magnetic tape, other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read data.

Various forms of computer readable media may be involved in carrying one or more sequences of one or more instructions to processor 300 (or any other processor of a device described herein) for execution. For example, the instructions may initially be borne on a magnetic disk of a remote computer. The remote computer can load the instructions into its dynamic memory and send the instructions over a telephone line using a modem. A modem local to a gaming device 104 (or, e.g., a server) can receive the data via telephone line and use an infrared transmitter to convert the data to an infrared signal. An infrared detector can receive the data carried in the infrared signal and place the data on a system bus for the processor 300. The system bus may transmit the data to main memory, from which the processor 300 retrieves and executes the instructions. The instructions received by main memory may optionally be stored in memory either before or after execution by the processor 300. In addition, instructions may be received via a communication port 324 as electrical, electromagnetic or optical signal(s), which are exemplary forms of carrier waves that carry data streams representing various types of information.

According to some embodiments of the present disclosure, the instructions of the program 326 may be read into a main memory (e.g., RAM 320) from another computer-readable medium, such as from a ROM 322. Execution of sequences of the instructions in the program 326 may cause the processor 300 to perform the process steps described herein.

In accordance with alternate embodiments of the present disclosure, hard-wired circuitry may be used in place of (or in combination with) software instructions for implementation of the processes of the present disclosure. Thus, embodiments of the present disclosure are not limited to any specific combination of hardware and software.

As discussed with respect to aforementioned systems 100, 200, execution of sequences of the instructions in a program of a peripheral device 210 in communication with the gaming device 204 may also cause the processor 300 to perform some of the process steps described herein.

The gaming device 104 and/or controller 102 memory also stores a plurality of databases including (i) a probability database 328, (ii) at least one payout database 330, (iii) a player database 332, (iv) a session database 334, and (v) an asset database 336. Each of the aforementioned databases will be described in detail herein below. Some or all of the data stored in each database is additionally described in conjunction with the description of the process steps also described herein below.

The described or illustrated entries of the databases represent exemplary information only. Those skilled in the art will understand that the number and content of the entries can be different from those illustrated herein. Further, despite any description of the databases as tables, an object-based model could be used to store and manipulate the data types of the present disclosure and likewise, object methods or behaviors can be used to implement the processes of the present disclosure.

Note that, although these databases may be described as being stored in a gaming device, in other embodiments of the present disclosure some or all of these databases may be partially or wholly stored in another device, such as one or more of the peripheral devices, the peripheral device server and/or the controller.

Further, some or all of the data described as being stored in the databases may be partially or wholly stored (in addition to or in lieu of being stored in the memory of the gaming device) in a memory of one or more other devices, such as one or more of the peripheral devices, another gaming device, the peripheral device server and/or the controller.

As discussed herein, in one or more embodiments the gaming device 104 may take the form of a slot machine configured to operate in conjunction with the present disclosure. Generally, a slot machine for use in the present disclosure comprises (i) a first game area, operative to display or conduct a reel-based slot machine game (e.g., a three reel or five reel slot machine game) and (ii) a second game area operative to display or conduct a secondary game based on results of the reel-based game. For example, a secondary game may compel a player to attempt to assemble (to the extent possible) a complete image from a plurality of image portions occurring within the context of the reel-based game, as described above.

In some embodiments the gaming device may take the form of a slot machine configured to operate in conjunction with the present disclosure, in which two or more players may operate the gaming device via one or more sets of controls, displays, credit acceptors/dispensers, etc. A more specific description of such a multiplayer slot machine suitable for use with the present disclosure is provided below.

The gaming device's first game area may include a display area in which an outcome for a game of the reel-based slot machine game is displayed to the player. The first game area may be embodied, for example, as a video display that displays graphical representations of reels. The first game area may, in another example, be glass behind which mechanical reels are located.

The first game area may further include a payline. In accordance with one or more embodiments of the present disclosure, a spin result is a set of symbols displayed along a payline of a reeled slot machine (i.e., the first game area).

The slot machine may further comprise means for initiating a reel-based game, such as a handle or dedicated button. A player may initiate the movement of the reels in the first game area by pulling the handle or actuating the button. Either or both of the handle and start button are exemplary embodiments of an input device 314, described herein above.

The gaming device 104 of the present disclosure may further comprise a second game area, for outputting information to a player. The second game area may be utilized, for example, to inform a player of his or her level of progress toward a game objective, such as assembling a completed image from a plurality of image portions. For example, the secondary game area may display information including image portions having been secured by the player as they relate to the completed image. In addition, the secondary game area may be utilized to inform a player of a level of completion of the game objective upon completion of a terminating event. Such an event may comprise an amount of elapsed time (e.g., 3 minutes) and/or a given number of spins or handle pulls (e.g., 100 pulls). As mentioned above, the player's progress may be indicated in any number of ways including but not limited to e.g., a percentage (e.g., 80% complete) and/or a ratio (e.g., 15 of 24 images secured).

The slot machine may also include a payment system 316, which may be comprised of a bill acceptor, a credit card reader, and/or a coin acceptor. A player may utilize the gaming device payment system 316 to establish a credit balance with the machine 104, to provide a wager as consideration for a given spin or handle pull and/or to receive payment for achieving a favorable result in the primary and/or secondary game(s).

The slot machine may further comprise a credit meter balance. The gaming device credit meter balance may operate to indicate an amount of electronic credits currently available to a player, as described above. The player may use the credits, for example, as wagers or consideration for primary or secondary games played on the gaming device. When appropriate, the electronic credits may be "cashed out" as coins, bills, tokens, a cashless gaming receipt, and/or credits to another financial account associated with the player.

Finally, the slot machine may comprise a hopper 306, hopper controller 308, and coin tray (not pictured). Dispensing coins or tokens into the coin tray may render payment to the player. Such coins may be dispensed based on, for example, a player's indication that the player would like to cash out his credit meter balance and/or a payout obtained by a player as a result of playing a primary or secondary game on the slot machine. Note that, where appropriate, the slot machine may comprise alternative and/or additional components besides (or in addition to) those discussed herein.

Figure 4:
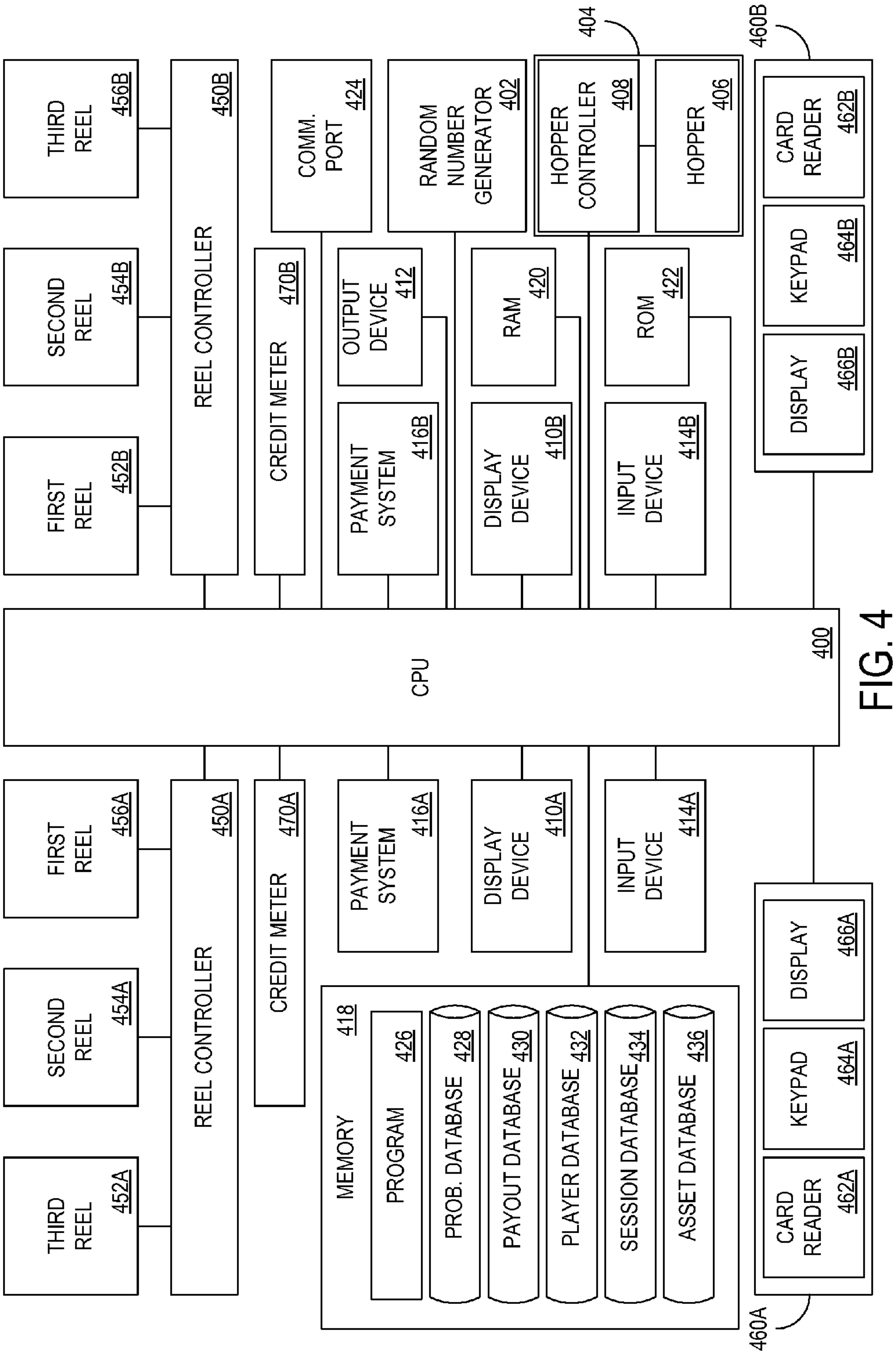
FIG. 4 is a block diagram illustrating an example multiplayer gaming device according to some embodiments of the present disclosure.

Turning to FIG. 4, in accordance with the present disclosure, a multiplayer gaming device 106/206 may be implemented as a system controller, a dedicated hardware circuit, an appropriately programmed general-purpose computer, or any other equivalent electronic, mechanical or electro-mechanical device. (Note that from this point forward, each reference to a "multiplayer gaming device" followed by the reference numeral 106 is intended to be equivalent to a reference to any of the gaming devices from either system 100 or system 200.)

A multiplayer gaming device 106 may be manufactured to accommodate two or more players at a single cabinet. It may include multiple player positions that provide different players with their own sets of controls and displays. Such an arrangement may be used to facilitate cooperative or head-to-head competitive play. Other benefits of multiplayer gaming devices 106 include reduced floor space requirements, reduced cost per player in terms of hardware savings, and facilitating couples playing in close proximity.

A multiplayer gaming device 106 may comprise, for example, a slot machine, a video poker machine, a video blackjack machine, a video keno machine, a video lottery machine, a pachinko machine or a tabletop game.

In various embodiments, a multiplayer gaming device 106 may comprise, for example, a personal computer (e.g., which communicates with an online casino via a Web site). The multiplayer gaming device 106 may comprise any or all of the gaming devices of the aforementioned systems.

In one or more embodiments, the multiplayer gaming device 106 may comprise a computing device operable to execute software that simulates play of a reeled slot machine game, video poker game, video blackjack game, video keno game, video roulette game, and/or lottery game.

The multiplayer gaming device 106 disclosed herein comprises a processor 400, such as one or more Intel® Pentium® processors. The processor 400 is in operative communication with at least one random (or pseudo-random) number generator 402, which may be a component of the multiplayer gaming device 106.

The random number generator 402, in accordance with at least one embodiment of the present disclosure, may generate data representing random or pseudo-random values (referred to as "random numbers" herein). The random number generator 402 may generate a random number every predetermined unit of time (e.g., every thousandth of a second) or in response to an initiation of a game on the multiplayer gaming device 106. In the former embodiment, the generated random numbers may be used as they are generated (e.g., the random number generated at substantially the time of game initiation is used for that game) and/or stored for future use.

A random number generated by the random number generator 402 may be used by the processor 400 to determine, for example, at least one of an outcome, a reel position, an arrangement of symbols and a payout. A random number generator 402, as used herein, may be embodied as a secondary (e.g., tamper-evident) processor separate from but working in cooperation with a primary gaming device processor 400.

Alternatively, the random number generator 402 may be embodied as an algorithm, program component, or software stored in the memory of the gaming device and used to generate a random number.

Note that, although the generation or obtainment of a random number is described herein as involving a random number generator 402 of a multiplayer gaming device 106, other methods of determining a random number may be employed. For example, a gaming device owner or operator may obtain sets of random numbers that have been generated by another entity. For example, HotBits™ is a service that provides random numbers that have been generated by timing successive pairs of radioactive decays detected by a Geiger-Muller tube interfaced to a computer. Various methods and devices for generating and using random numbers for gambling purposes will be apparent to one of skill in the art.

The processor 400 may further be operable to communicate with a benefit output device 404, which may be a component of multiplayer gaming device 106. For example, the benefit output device 404 may comprise one or more devices for outputting a benefit to a player of the multiplayer gaming device 106. In accordance with some embodiments, the multiplayer gaming device 106 may provide coins and/or tokens as a benefit (e.g., a spin payout or a game payout). In accordance with such an embodiment the benefit output device 404 may comprise a hopper 406 coupled to a hopper controller 408, for dispensing e.g., coins and/or tokens into a coin tray of the gaming device.

In another example, the multiplayer gaming device 106 may provide a receipt or other document on which there is printed an indication of a benefit (e.g., a cashless gaming receipt that has printed thereon an indication of a monetary value, which is redeemable for cash in the amount of the monetary value). In accordance with such an embodiment, the benefit output device 404 may comprise a printing and document dispensing mechanism or ticket-in/ticket-out device (not pictured).

According to yet another embodiment, the gaming device may provide electronic credits as a benefit (which, e.g., may be subsequently converted to coins and/or tokens and dispensed from a hopper into a coin tray). In such an embodiment the benefit output device 404 may comprise or include a credit meter balance and/or a processor that manages the amount of electronic credits that is indicated on a display of a credit meter balance.

In accordance with another embodiment, the multiplayer gaming device 106 may credit a monetary amount to a financial account associated with a player. The financial account may be, for example, a credit card account, a debit account, a charge account, a checking account, and/or a casino account. In such an embodiment the benefit output device 404 may comprise a device for communicating with a server on which the financial account is maintained.

Note that, in one or more embodiments, the multiplayer gaming device 106 may include more than one benefit output device 404. For example, the gaming device may include both a hopper 406 and hopper controller 408 combination and two separate credit meter balances 470A, 470B. Accordingly, the multiplayer gaming device 106 of the present disclosure may be operable to provide more than one type of benefit to the player(s) of the multiplayer gaming device 106.

The processor is also operable to communicate with a display device 410, which may be a component of the multiplayer gaming device 106. The display device 410 may comprise, for example, one or more display screens or areas for outputting information related to game play on the gaming device. For example, the display device 410 may comprise or include a cathode ray tube (CRT) monitor, liquid crystal display (LCD) screen, or light emitting diode (LED) screen. In one or more embodiments, a multiplayer gaming device 106 may comprise more than one display device 410. For example, a multiplayer gaming device 106 may comprise a first game area having an LCD display for displaying the results of a first player and a second game area comprising a second LCD for displaying game results of a second player.

A display device 410 may comprise, for example, one or more display areas. For example, one of the display areas may display outcomes of spins or handle pulls played on the gaming device (e.g., on electronic reels of a gaming device). A second display area may display information associated with the progress of two players toward a broader game objective. A third display area may display e.g., the benefits obtainable by playing a game of the gaming device (e.g., in the form of a payout table). In one or more embodiments, the multiplayer gaming device 106 may include more than one display device 410, one or more other output devices 412, or a combination thereof (e.g., an upper game area, a lower game area, a credit meter, and left and right audio speakers).

As suggested above, the processor 400 may also be in communication with one or more other devices besides the display device, for outputting information (e.g., to a player or another device). Such other output devices 412 may also be components of the multiplayer gaming device 106 of the present disclosure. Such devices 412 may comprise, for example, an audio speaker (e.g., for outputting an outcome or information related thereto, in addition to or in lieu of such information being output via a display device 410), an infrared transmitter, a radio transmitter, an electric motor, a printer (e.g., such as for printing cashless gaming vouchers), a coupon or product dispenser, an infra-red port (e.g., for communicating with a second multiplayer gaming device 106 or a portable device of a player), a Braille computer monitor, and a coin or bill dispenser.

For multiplayer gaming devices 106, common output devices 412 include a cathode ray tube (CRT) monitor on a video poker machine, a bell on a multiplayer gaming device 106 (e.g., rings when a player wins), an LED display of a player's credit balance on a multiplayer gaming device 106, an LCD display of a personal digital assistant (PDA) for displaying keno numbers, etc.

An output device may also include reel controllers 450A, 450B for controlling reels 452A, 454A, 456A; 452B 454B, 456B respectively for displaying spin results at each player station.

The processor 400 may also be in communication with an input device 414, which is a device that is capable of receiving an input (e.g., from a player or another device) and which may be a component of multiplayer gaming device 106. An input device 414 may communicate with or be part of another device (e.g., a server, a gaming device, etc.).

Exemplary input devices 414 include: a bar-code scanner, a magnetic stripe reader, a computer keyboard or keypad, a button, a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, and an infrared port (e.g., for receiving communications from a second gaming device or from a another device such as a smart card or PDA of a player).

With respect to the multiplayer gaming device 106 of the present disclosure, additional or alternative input devices 414A, 414B may include one or more button(s) or touch-screen(s) (e.g., on a slot machine), a lever or handle connected to the gaming device, a magnetic stripe reader (e.g., to read a player tracking card inserted into a gaming device), a touch-screen for input of player selections during game play, and a coin and bill acceptor. In some embodiments, the multiplayer gaming device 106 may include player tracking card devices 460A, 460B. These devices may include, e.g., card readers 462A, 462B; keypads 464A, 464B; and displays 466A,466B, respectively.

The processor 400 may also be in communication with a payment systems 416A, 416B, which may be components of the multiplayer gaming device 106. The payment systems 416A, 416B may be devices capable of accepting payment from a player (e.g., a bet or establishment of a balance) and/or providing payment to a player (e.g., a spin payout and/or a game payout). Payment may not be limited to money, but may also include other types of consideration, including products, services, and alternate currencies. Exemplary methods of accepting payment by the payment systems 416A, 416B include (i) receiving currency (i.e., coins, tokens or bills). Accordingly, the payment systems 416A, 416B may comprise coin or bill acceptors.

In accordance with other embodiments of the disclosure, the payment systems 416A, 416B may receive payment via an alternate currency (e.g., a paper cashless gaming voucher, a coupon, a non-negotiable token). Accordingly the payment systems 416A, 416B may comprise bar code readers or other sensing means. In some embodiments, payment systems 416A, 416B may operate to receive payment identifiers (e.g., a credit card number, a debit card number, player tracking card number, etc.) and to debit accounts identified by the payment identifiers.

The processor is additionally in communication with a memory and a communications port 424 (e.g., for communicating with one or more other devices). The memory may comprise any appropriate combination of magnetic, optical and/or semiconductor memory, and may include, for example, Random Access Memory (RAM) 420, Read-Only Memory (ROM) 422, a compact disc and/or a hard disk 418. That is, the memory may comprise or include any type of computer-readable medium. The processor 400 and the memory may each be, for example: (i) located entirely within a single computer or other device; or (ii) connected to each other by a remote communication medium, such as a serial port cable, telephone line or radio frequency transceiver. In one embodiment, the multiplayer gaming device 106 may comprise one or more devices that are connected to a remote server computer for maintaining databases.

The memory stores a program 426 for controlling the processor 400. The processor 400 performs instructions of the program 426, and thereby operates in accordance with the present disclosure, and particularly in accordance with the methods described in detail herein.

The program 426 may be stored in a compressed, uncompiled and/or encrypted format. The program 426 furthermore includes program elements that may be necessary, such as an operating system, a database management system and "device drivers" for allowing the processor 400 to interface with computer peripheral devices. Appropriate program elements are known to those skilled in the art, and need not be described in detail herein.

The terms "computer-readable medium" and "computer-readable media" as used herein are synonymous and may refer to any medium that stores and/or participates in providing instructions to the processor 400 of the multiplayer gaming device 106 (or any other processor of a device described herein) for execution. Such a medium may take many forms, including but not limited to, non-volatile media, volatile media, and transmission media. Exemplary non-volatile media include e.g., optical or magnetic disks, such as compact discs (CDs), Digital Versatile Discs (DVDs), etc. Exemplary volatile media may include dynamic random access memory (DRAM), which typically constitutes the main memory. Transmission media include coaxial cables, copper wire and fiber optics, including wires comprising a system bus coupled to the processor. Transmission media may carry acoustic or light waves, such as those generated during radio frequency (RF) and infrared (IR) data communications.

Exemplary forms of computer-readable media include, for example, a floppy disk, a flexible disk, hard disk, magnetic tape, other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read data.

Various forms of computer readable media may be involved in carrying one or more sequences of one or more instructions to processor 400 (or any other processor of a device described herein) for execution. For example, the instructions may initially be borne on a magnetic disk of a remote computer. The remote computer can load the instructions into its dynamic memory and send the instructions over a telephone line using a modem. A modem local to a multiplayer gaming device 106 (or, e.g., a server) can receive the data via telephone line and use an infrared transmitter to convert the data to an infrared signal. An infrared detector can receive the data carried in the infrared signal and place the data on a system bus for the processor 400. The system bus may transmit the data to main memory, from which the processor 400 retrieves and executes the instructions. The instructions received by main memory may optionally be stored in memory either before or after execution by the processor 400. In addition, instructions may be received via a communication port 424 as electrical, electromagnetic or optical signal(s), which are exemplary forms of carrier waves that carry data streams representing various types of information.

According to some embodiments of the present disclosure, the instructions of the program 426 may be read into a main memory (e.g., RAM 420) from another computer-readable medium, such as from a ROM 422. Execution of sequences of the instructions in the program 426 may cause the processor 400 to perform the process steps described herein.

In accordance with alternate embodiments of the present disclosure, hard-wired circuitry may be used in place of (or in combination with) software instructions for implementation of the processes of the present disclosure. Thus, embodiments of the present disclosure are not limited to any specific combination of hardware and software.

As discussed with respect to aforementioned systems 100, 200, execution of sequences of the instructions in a program of a peripheral device 210 in communication with the gaming device 204 may also cause the processor 400 to perform some of the process steps described herein.

The multiplayer gaming device 106 and/or controller 102 memory also stores a plurality of databases including (i) a probability database 428, (ii) at least one payout database 430, (iii) a player database 432, (iv) a session database 434, and (v) an asset database 436. Each of the aforementioned databases will be described in detail herein below. Some or all of the data stored in each database is additionally described in conjunction with the description of the process steps also described herein below.

The described or illustrated entries of the databases represent exemplary information only. Those skilled in the art will understand that the number and content of the entries can be different from those illustrated herein. Further, despite any description of the databases as tables, an object-based model could be used to store and manipulate the data types of the present disclosure and likewise, object methods or behaviors can be used to implement the processes of the present disclosure.

Note that, although these databases may be described as being stored in a gaming device, in other embodiments of the present disclosure some or all of these databases may be partially or wholly stored in another device, such as one or more of the peripheral devices, the peripheral device server and/or the controller.

Further, some or all of the data described as being stored in the databases may be partially or wholly stored (in addition to or in lieu of being stored in the memory of the gaming device) in a memory of one or more other devices, such as one or more of the peripheral devices, another gaming device, the peripheral device server and/or the controller.

As discussed herein, in one or more embodiments the multiplayer gaming device 106 may take the form of a slot machine configured to operate in conjunction with the present disclosure. Generally, a slot machine for use in the present disclosure comprises (i) a first game area, operative to display or conduct a reel-based slot machine game (e.g., a three reel or five reel slot machine game) and (ii) a second game area operative to display or conduct a secondary game based on results of the reel-based game. For example, a secondary game may involve the cooperation of two players toward achieving a common goal.

In some embodiments the gaming device may take the form of a slot machine configured to operate in conjunction with the present disclosure, in which two or more players may operate the gaming device via one or more sets of controls, displays, credit acceptors/dispensers, etc. A more specific description of such a multiplayer slot machine suitable for use with the present disclosure is provided below.

The gaming device's first game area may include a display area in which an outcome for a game of the reel-based slot machine game is displayed to the player. The first game area may be embodied, for example, as a video display that displays graphical representations of reels. The first game area may, in another example, be glass behind which mechanical reels are located.

The first game area may further include a payline. In accordance with one or more embodiments of the present disclosure, a spin result is a set of symbols displayed along a payline of a reeled slot machine (i.e., the first game area).

The slot machine may further comprise means for initiating a reel-based game, such as a handle or dedicated button. A player may initiate the movement of the reels in the first game area by pulling the handle or actuating the button. Either or both of the handle and start button are exemplary embodiments of an input device 414, described herein above.

The multiplayer gaming device 106 of the present disclosure may further comprise a second game area, for outputting information to a player. The second game area may be utilized, for example, to inform a player of his or her level of progress toward a game objective, such as his position in a racing game. For example, the secondary game area may display information including images indicating where a canoe controlled by the actions of two players is positioned relative to a competing canoe controlled by a computer opponent. In addition, the secondary game area may be utilized to inform a player of a level of completion of the game objective upon completion of a terminating event. Such an event may comprise an amount of elapsed time (e.g., 4 minutes) and/or a given number of spins or handle pulls (e.g., 100 pulls). As mentioned above, the player's progress may be indicated in any number of ways including but not limited to e.g., a percentage (e.g., 80% complete) and/or a ratio (e.g., 15 of 24 images secured).

The slot machine may also include payment systems 416A, 416B, which may be comprised of a bill acceptors, a credit card readers, and/or a coin acceptors. Player may utilize the multiplayer gaming device payment systems 416A, 416B to establish credit balances with the machine 104, to provide wagers as consideration for a given spin or handle pull and/or to receive payments for achieving favorable result in the primary and/or secondary game(s).

The slot machine may further comprise one or more credit meter balances 470A, 470B. The gaming device credit meter balance may operate to indicate an amount of electronic credits currently available to a player, as described above. The player may use the credits, for example, as wagers or consideration for primary or secondary games played on the gaming device. When appropriate, the electronic credits may be "cashed out" as coins, bills, tokens, a cashless gaming receipt, and/or credits to another financial account associated with the player.

Finally, the slot machine may comprise a hopper 406, hopper controller 408, and coin tray (not pictured). Dispensing coins or tokens into the coin tray may render payment to the player. Such coins may be dispensed based on, for example, a player's indication that the player would like to cash out his credit meter balance and/or a payout obtained by a player as a result of playing a primary or secondary game on the slot machine. Note that, where appropriate, the slot machine may comprise alternative and/or additional components besides (or in addition to) those discussed herein.

Figure 5A:
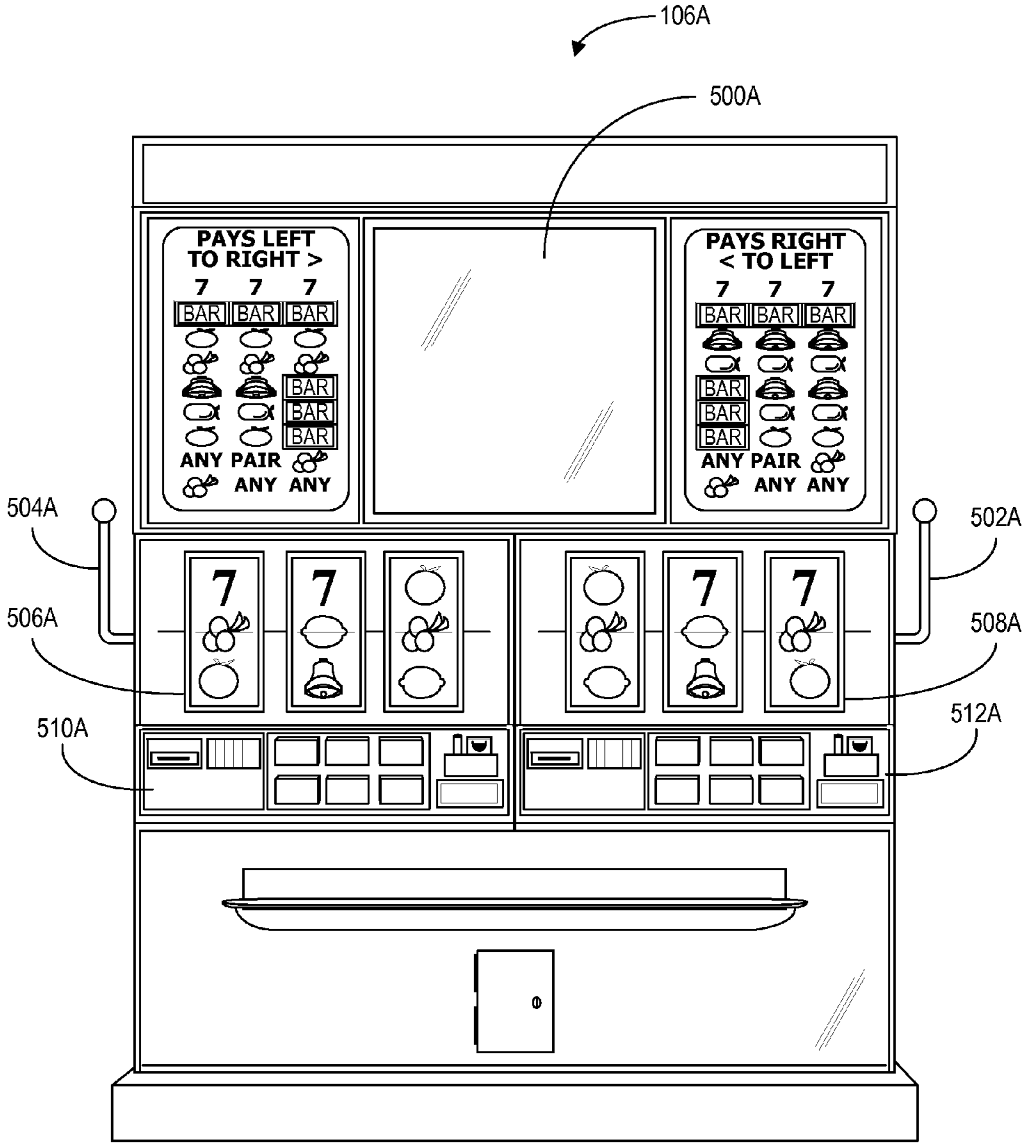
FIGS. 5A through 5C are plan views of a multiplayer gaming device according to some embodiments of the present disclosure.
Figure 5B:
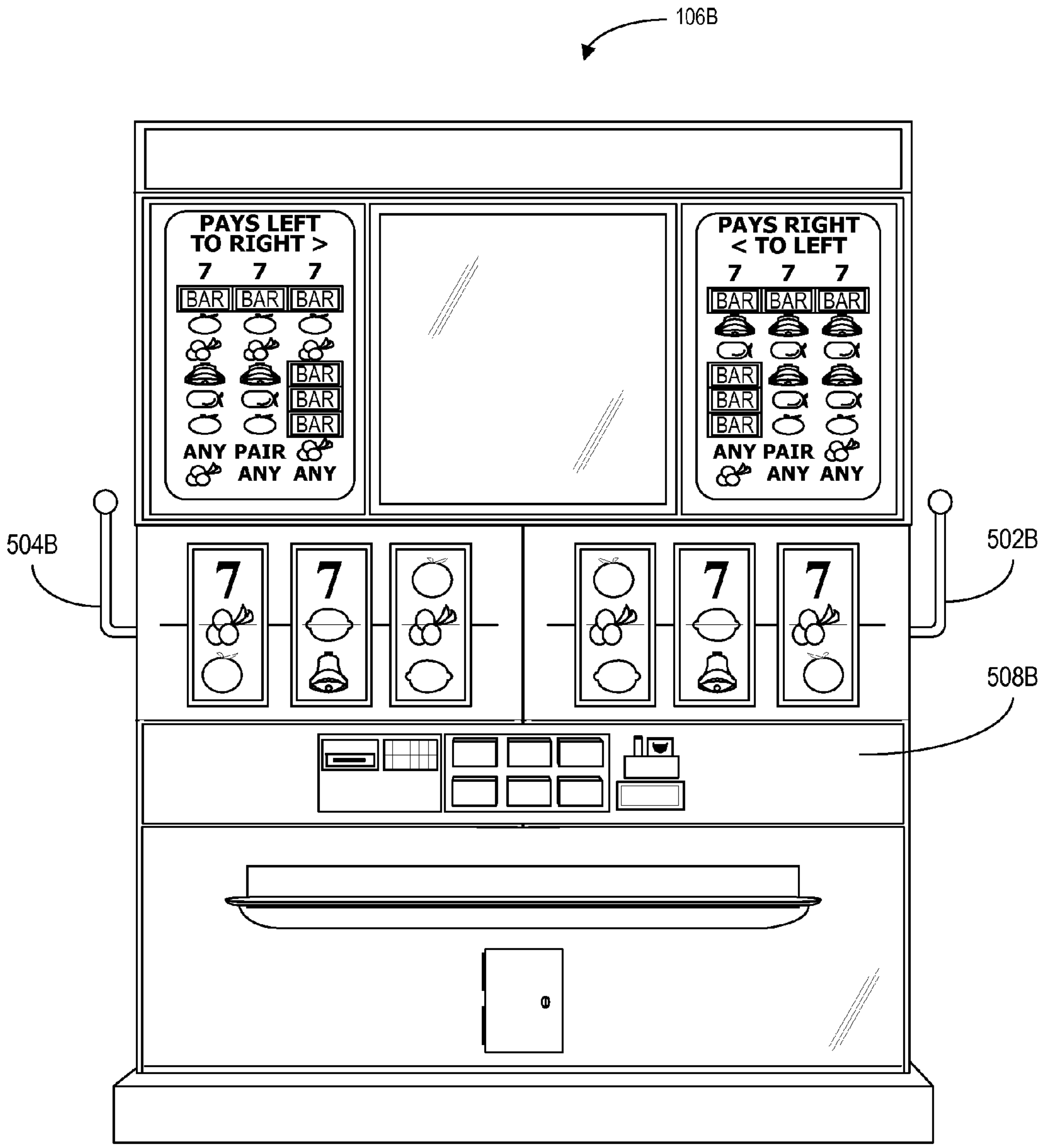
Figure 5C:
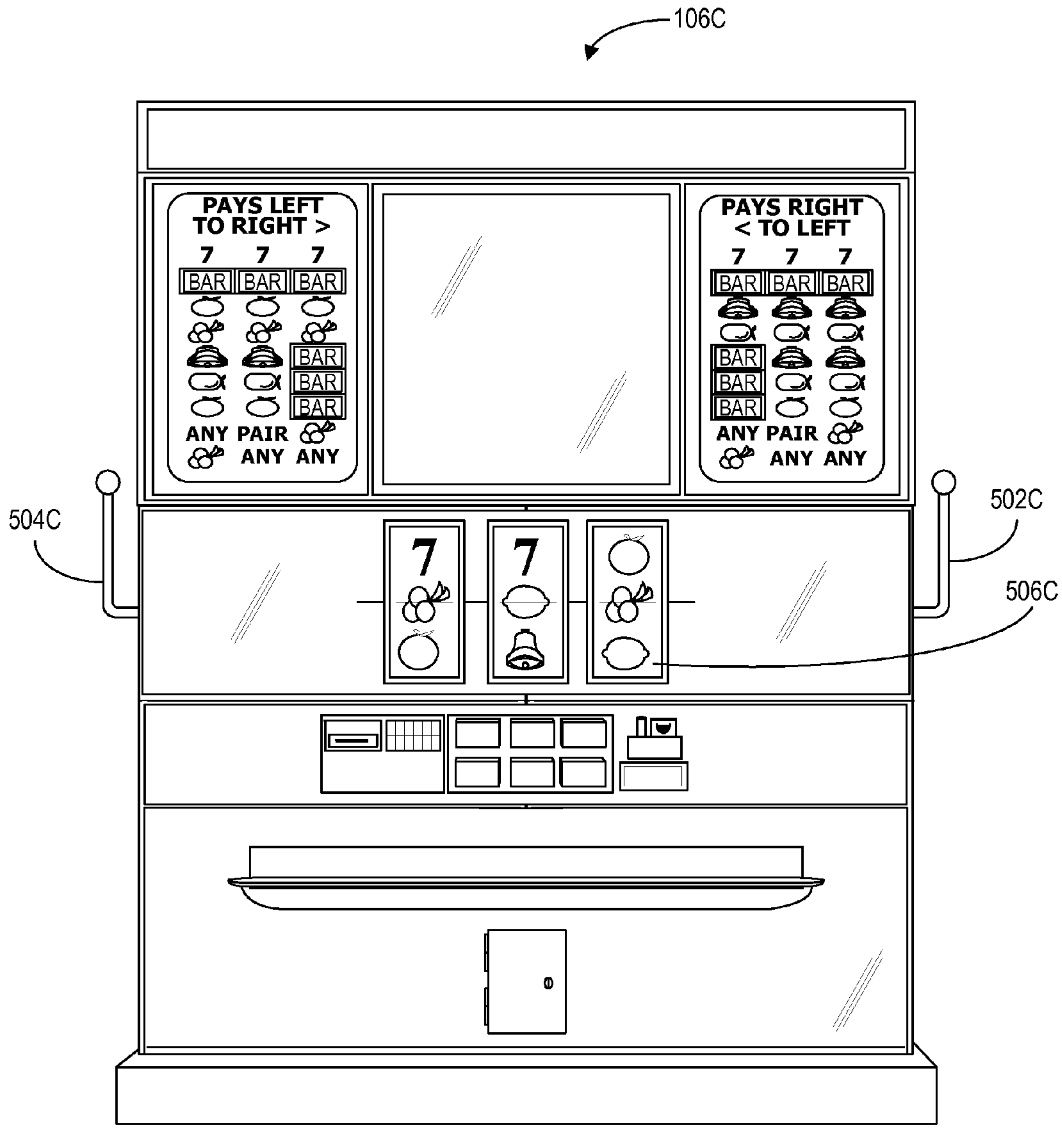

Turning to FIGS. 5A through 5C, illustrations of example multiplayer gaming devices 106A, 106B, 106C are provided. Device 106A includes a single shared central display 500A that may be useful for displaying cumulative outcome information and other secondary game information to players. The device 106A also provides both of the players with their own set of main display areas 506A and 508A, respectively, as well as their own payment systems 510A and 512A, respectively, and handles 504A and 502A, respectively. Separate payment systems 510A and 512A facilitate making different payouts to each player and accepting payments for each player individually. However, separate payment systems 510A and 512A are not absolutely necessary as illustrated in example device 106B of FIG. 5B. In the multiplayer gaming devices 106B, players may receive payouts and pay for credit balances separately through the use of player tracking card accounts and cashless gaming receipts in a single, shared payment system 508B. Alternatively, the gaming device 106B may only accept a single payment for both players, for example, in the case of a husband and wife players. The device 106B still allows both players to control the actual play by providing separate handles 502B and 504B. Turning to FIG. 5C, illustrates that in some embodiments players may share the main play area 506C while still allowing both players to control the actual play by providing separate handles 502C and 504C. In such an embodiment, players may alternate making handle pulls or only cause one or two reels to spin each. In some embodiments, the secondary game area may instructed the players when to make a handle pull.

D. DATABASES

As indicated above, it should be noted that although the example embodiments depicted in FIG. 3 and FIG. 4 include five particular databases 328, 330, 332, 334, 336 stored on a hard disk memory 318, other database arrangements may be used which would still be in keeping with the spirit and scope of the present disclosure. In other words, the present disclosure could be implemented using any number of different database files or data structures, as opposed to the five depicted in FIG. 3 and FIG. 4. Further, the individual database files could be stored on different devices (e.g., located on different storage devices in different geographic locations, such as on a third-party server). Likewise, the program 326 could also be located remotely from the hard disk memory 318 and/or on another server. As indicated above, the program 326 may include instructions for retrieving, manipulating, and storing data in the databases 328, 330, 332, 334, 336 as may be useful in performing the methods of the disclosure as will be further described below.

1. Probability Database

Where appropriate, a probability database may be utilized in the performance of the inventive processes described herein. More specifically, a probability database may be stored in a data storage device (e.g., of the gaming device and/or controller) in tabular form, or any other appropriate database form, as is known in the art.

The data stored therein may include a number of exemplary records or entries, each defining a random number. Those skilled in the art will understand that the probability database may include any number of entries. The tabular representation may also define fields for each of the entries or records. The fields may specify: (i) a random number or range of random numbers that may be generated by the random number generator; and (ii) an outcome, that indicates the one or more indicia comprising the outcome that corresponds to the random number of a particular record.

A gaming device may utilize a probability database to determine, for example, which outcome corresponds to a random number generated by a random number generator and to display the determined outcome in accordance with a reel-based game (e.g., a three-reeled game). For example, the outcome may comprise the three symbols to be displayed along the payline of a three-reel slot machine.

Other arrangements of probability databases or probability tables are possible. For example, the book "Winning At Slot Machines" by Jim Regan (Carol Publishing Group Edition, © 1997), the entirety of which is incorporated by reference herein for all purposes, illustrates examples of probability tables and how they may be derived.

2. Payout Database

Where appropriate, one or more payout database(s) 330 may be utilized in the performance of the inventive processes described herein. More specifically, a first payout database may be employed for purposes of conducting a reel-based slot machine game at the gaming device. Further, a second payout database may be employed for purposes of conducting a secondary game at the gaming device. More specifically, the first payout database may be used to determine payouts to be awarded to players for achieving favorable outcomes during a reel-based slot machine game (e.g., three matching symbols on the machine's payline). The second payout database may be used to determine an appropriate award for achieving a level of completion associated with a secondary game objective. In accordance with the disclosure, the secondary game objective may compel the player to attempt to assemble a completed image from a plurality of image portions occurring within the context of a reel-type slot machine game. In another embodiment, a single payout database is shared between two or more players. Each player contributes outcomes to a combined game, with payouts determined by a common payout table.

In accordance with various embodiments of the present disclosure, the one or more payout database(s) may be stored at the gaming device and/or controller in tabular form, or any other appropriate database form, as is well known in the art.

The data stored therein includes a number of example records or entries, each defining an outcome that may be obtained on a gaming device that corresponds to a payout. For purposes of the reel based game, the first payout table may comprise a field defining various symbol combinations stored in correlative relation to information defining an award that may be conferred to a player for having achieved the symbol combination.

For purposes of the secondary game, the second payout table may comprise a field indicating levels or amounts of progress toward an overall game objective, such as the progress of a game character in a three legged race. The individual indications of progress may be stored in correlative relation to an amount of payout or award to be conferred or entitled to the player in exchange for achieving the corresponding level of progress.

Those skilled in the art will understand that the payout database(s) may include any number of entries. Other arrangements of payout databases are possible. For example, the book "Winning at Slot Machines" by Jim Regan incorporated above, illustrates examples of payout tables and probability tables (described above) and how they may be derived.

3. Player Database

Turning to FIG. 6, in accordance with the present disclosure, a data storage device or hard disk memory 318 of the gaming device 104 and/or the controller 102 may operate to store a player database 332. Generally, the gaming device 104 and/or the controller 102 may utilize the player database 332 to store data relating to the player such as a name, address, or indication of partners linked to his gaming device 104. Specific uses for player information will be described in detail below.

According to some embodiments of the disclosure, the player database 332 may be stored in tabular form at either (or both) the gaming device 104 and/or controller 102. In accordance with other embodiments of the disclosure, the player database 332 may be stored at any location and in any form that is practicable.

The player database 332 may include any number of records or entries. The database may define fields for each of the entries including (i) a player identifier field 602, (ii) a player name field 604, (iii) an address field 606, (iv) a "How Linked?" field 608, (v) a partner identifier field 610, (vi) a linked machine identifier field 612, and (vii) a preferred game related identity field 614.

For each record or entry in the player database 332, a player identifier field 602 stores a unique numeric, alphanumeric or other type of code that uniquely identifies the corresponding player. The player identifier 602 may be generated and assigned e.g., by an administrator of the system of the present disclosure.

For each record or entry, a name field 604 and address field 606 stores information that may be used by the gaming device 104 and/or the controller 102 for purposes of identifying or contacting the particular player.

For each record or entry in the player database 332, a "How Linked?" field 608 stores an indication of whether or not the identified player is linked with another player on the gaming floor. For example, in the context of the game described above wherein two players engage in a cooperative slot game at a two person cabinet, field 608 may store an indication of "TWO PLAYER CABINET" to indicate that the identified player is participating in a two player game at a single game cabinet. In an embodiment in which two machines are linked together via a network, field 608 may indicate "VIA NETWORK" for those players currently linked via the network.

For each record or entry of the player database 332, partner identifier fields 610 store information representing the identity of the player who is currently playing a game with the identified player. For example, filed 610 indicates that "P 222 222" is the partner of player "P 111 111". As previously indicated with reference to field 608, these players are both playing at "TWO PLAYER CABINET". Note that for those players not playing linked sessions, field 610 indicates "N/A".

For each record or entry of the player database 332, a linked machine identifier 612 field stores information identifying the gaming device which a particular player is linked to via the network. For example, players "P 333 333" and "P 444 444" are currently linked via the network using machines "M 4567" and "M 7612".

For each record or entry of the player database 332, a preferred game related identity field 614 stores information identifying game tokens/avatars that are preferred by that particular player. For example, player "P 111 111" prefers the game symbols "HAT, DOG", so that when a gaming session is initiated that uses such symbols (such as a Monopoly® game) the player may automatically be assigned his preferred game token when the game begins.

4. Session Database

Turning to FIG. 7, in accordance with the present disclosure, the data storage device or hard disk memory 318 of the gaming device 104 and/or the controller 102 may operate to store a session database 334. Generally, the gaming device 104 and/or the controller 102 may utilize the session database 334 to store information relating to a gaming session associated with one or more players. For example, a player may establish a gaming session with another player in which Monopoly® game properties are collected during the game session. These assets are held by the players during the session and may result in coin payouts during or at the conclusion of the session.

The session database 334 may comprise a plurality of records or entries. The database itself may be stored in tabular form or any other form that is practicable (e.g., object-based). The database defines fields for each of the entries, including (i) a player identifier field 702, (ii) a first asset field 704, (iii) a second asset field 706, (iv) a third asset field 708, and (v) a fifth asset field 710. The information stored in the session database 334 may be generated by controller 102 and/or gaming device 104

For each record or entry, a player identifier field 702 may store a unique numeric, alphanumeric or other type of code that uniquely identifies the player of the gaming session.

For each player identifier 702 stored in the previously described field, an entry may be stored in one of the four asset fields 704, 706, 708, and 710 of the corresponding record or entry, e.g., "P 111 111" is associated with a first asset 704 of "A 1234", a second asset 706 of "A 1237", a third asset 708 of "A 1239" and a fourth asset 710 of "A 1225". These assets may provide benefits to the player throughout the duration of his gaming session, as will be described more fully below with respect to the asset database of FIG. 8.

5. Asset Database

Turning to FIG. 8, in accordance with the present disclosure, the data storage device or hard disk memory 318 of the gaming device 104 and/or the controller 102 may operate to store an asset database 336. Generally, the gaming device 104 and/or the controller 102 may utilize the asset database 336 to store information pertaining to assets that may be accumulated by players in gaming sessions at gaming device 104.

The asset database 336 may comprise a plurality of records or entries. The database itself may be stored in tabular form or any other form that is practicable (e.g., object-based). The database defines fields for each of the entries, including (i) an asset identifier field 802, (ii) an asset name field 804, and (iii) an asset description field 806.

For each record or entry in the asset database 336, an asset identifier 802 may store data that uniquely identifies an asset that has been obtained by a player, either alone or in cooperation with one or more other players.

For each asset identifier 802 stored in a record of the asset database 336, an asset name field 804 stores data describing the name of the asset. For example, asset identifier "A 3490" is associated with asset name 804 of "GOLD TREASURE CHEST".

For each asset identifier 802 stored in a record of the asset database 336, an asset description field 806 stores a description of the particular asset which may include monetary awards associated with the asset or rules governing the duration of the asset. For example, asset identifier 802 of A 4678" corresponds to an asset description 806 of "WILDCARD WHICH CAN ONLY BE USED TO COMPLETE A FLUSH. EXPIRES AFTER 30 SPINS."

E. METHODS

The system discussed above, including the hardware components and the databases, are useful to perform the methods of the disclosure. However, it should be understood that not all of the above described components and databases are necessary to perform any of the present disclosure's methods. In fact, in some embodiments, none of the above described system is required to practice the present disclosure's methods. The system described above is an example of a system that would be useful in practicing the disclosure's methods. For example, the spin results database described below may be useful for tracking and analyzing information about a players' outcomes, but it is not absolutely necessary to have such a database in order to perform the methods of the disclosure. In other words, the methods described below may be practiced, for example, by directly passing spin results to the process that analyzes outcomes using a processor's registers.

Figure 9A:
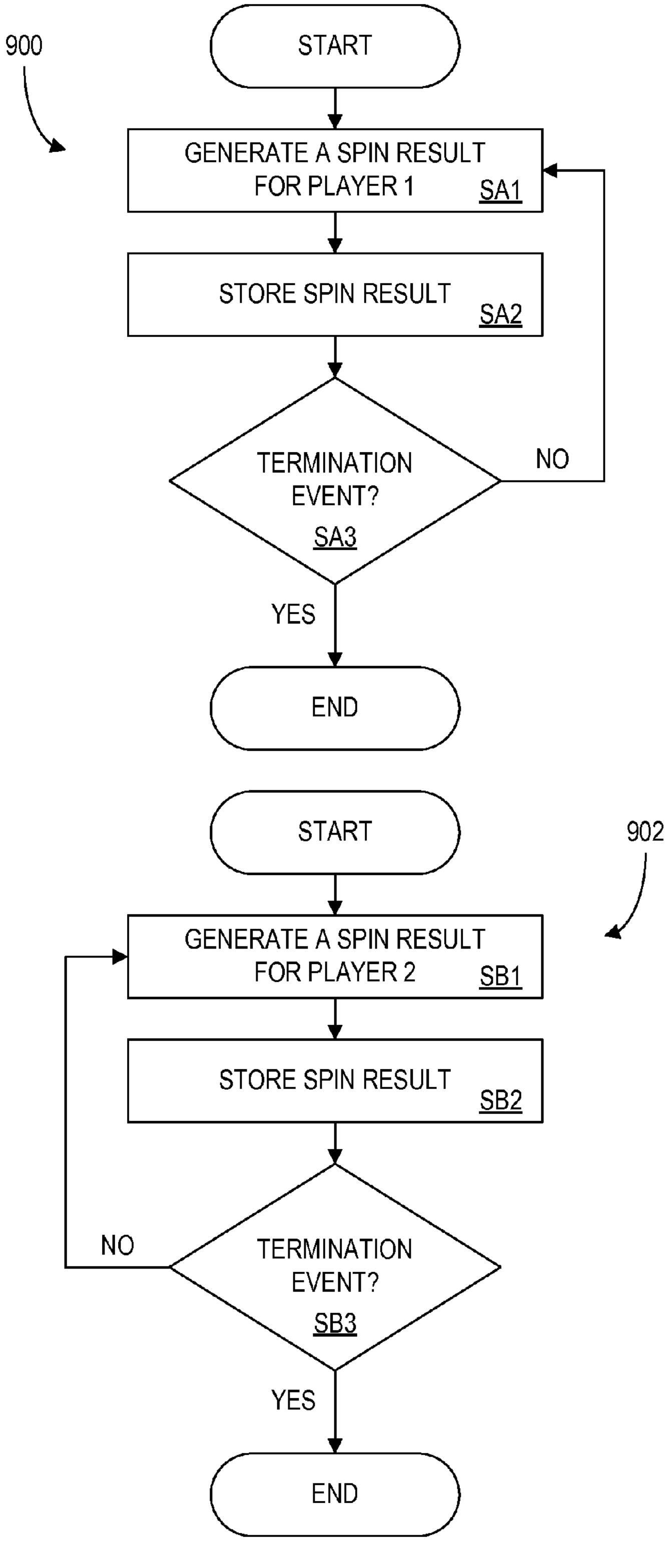
FIGS. 9A and 9B are flow charts illustrating an example process according to some embodiments of the present disclosure.
Figure 9B:
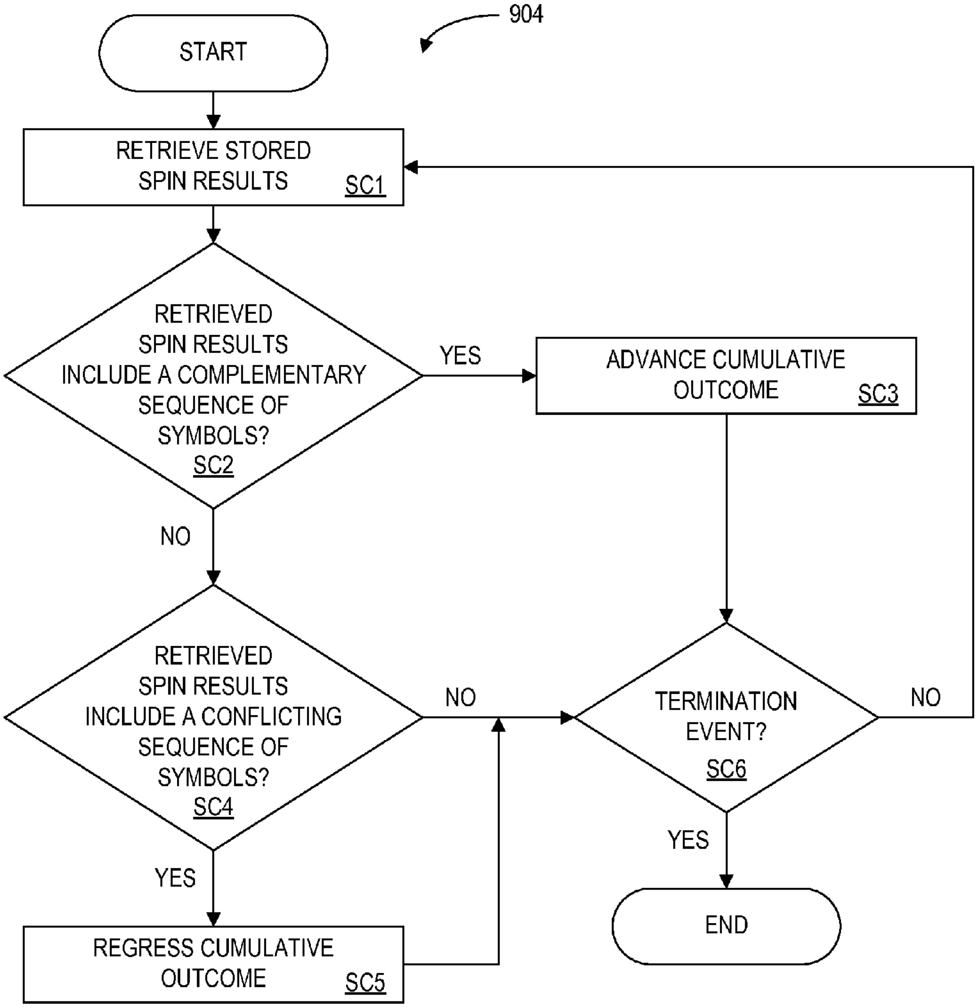
Figure 10:
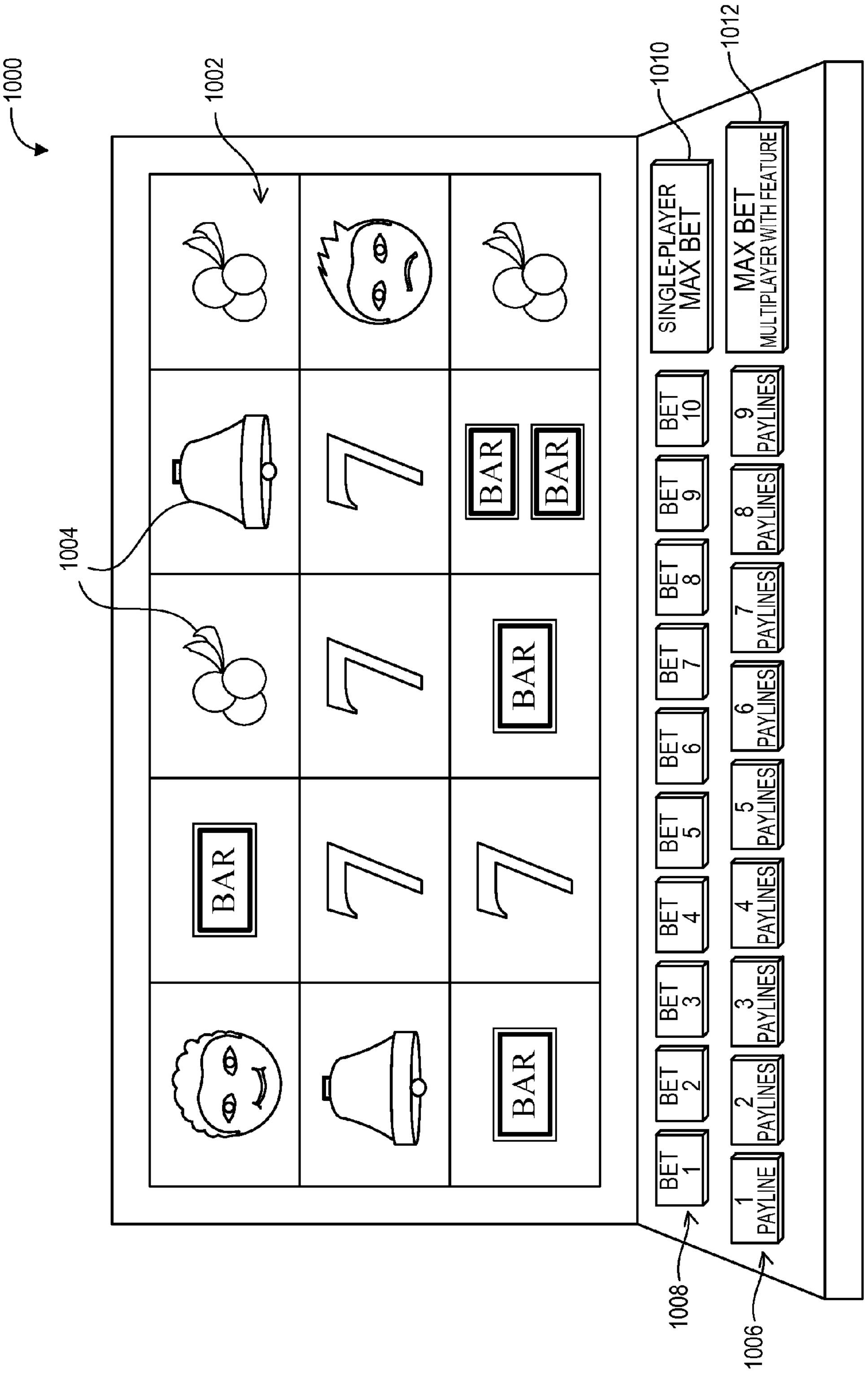
FIG. 10 illustrates an exemplary player interface according to one embodiment of the present disclosure.

Referring to FIGS. 9A and 9B, flow charts are depicted that represent some embodiments of the present disclosure that may be performed by the controller 102, gaming devices 104,106,108, and/or the casino. It must be understood that the particular arrangement of elements in the flow charts of FIGS. 9A and 9B, as well as the number and order of example steps of various methods discussed herein, is not meant to imply a fixed order, sequence, quantity, and/or timing to the steps; embodiments of the present disclosure can be practiced in any order, sequence, and/or timing that is practicable. Likewise, the labels used to reference the individual steps of the methods are not meant to imply a fixed order, sequence, quantity, and/or timing to the steps. In other words, for example, Step SC2 may be followed by Step SC4 in some situations and Step SC3 in others.

Turning to FIGS. 9A and 9B, flow charts are provided depicting an example method embodiment of the present disclosure in which three processes 900, 902, 904 run concurrently. In general, process 900 involves generating a spin result in Step SA1, recording the spin result in Step SA2, determining if a termination event has occurred in Step SA3 and if not, repeating the process 900. This process 900 may be performed for a first player of a gaming device or for a first one of the players of a multiplayer gaming device 106. Likewise, process 902, which may run while process 900 runs, involves the same three steps as process 900. Process 902 may be performed for a second player by a gaming device linked to the first player's gaming device or for a second one of the players of a multiplayer gaming device. Clearly, processes 900, 902 may be replicated on any number of gaming devices or at any number of stations of a multiplayer gaming device.

Process 904 depicted in FIG. 9B includes Step SC1, retrieving the spin results stored by the linked gaming devices (or multiplayer gaming device) operating the processes 900, 902 described above, determining if the spin results collectively include a complementary sequence of symbols in Step SC2, advancing a cumulative outcome if they do in Step SC3, and returning to Step SC1 to retrieve additional spin results if no termination has occurred in Step SC6. If the retrieved results do not include a complementary sequence of symbols as determined in Step SC2, in some embodiments a determination is made if the retrieved results include a conflicting sequence of symbols in Step SC4. If so, the cumulative outcome may be regressed in Step SC5. In either case, flow returns to Step SC1 to retrieve additional spin results if no termination has occurred in Step SC6.

Details and variations of the above general steps will now be discussed. Processes 900, 902 may include the linked gaming devices (or multiplayer device) making payouts for individual spin results as winning outcomes of the primary games occur. The players effectively contribute their spin results to the secondary game when the system stores the results for the process 904. Note that in some embodiments, all the spin results are stored for process 904 but in other embodiments, only spin results that include a game piece relevant to a secondary game may be stored for process 904. Note that in some embodiments, spin results are not stored but merely passed to process 904 which receives them as they become available.

Process 904 is provided as an example embodiment of the present disclosure. Many variations within the scope of the disclosure are possible. As indicated above, retrieving spin results may involve merely receiving results as opposed to retrieving them from, for example a database or a first-in-first-out memory stack. In different embodiments, the spin results may be gathered for consideration as they are generated, at a regular frequency, and/or only after a set number accumulate in memory.

The determination of whether the spin results include "a complementary sequence of symbols" as described in Step SC2 may actually include many different alternative and/or additional determinations. In some embodiments, for example, the system may simply compare on a one-for-one basis a spin result (or symbol, or game piece) from each player and decide if they match, correspond, fit together, and/or otherwise relate to each other. In some embodiments the relative or absolute timing of the different player's contributions may be considered. For example, a sequence of game pieces from two players may include the following:

| Piece# | Player | Piece | Time Stamp |
|---|---|---|---|
| 961 | Player 2 | RIGHT OAR | 10:03:09 AM |
| 962 | Player 1 | LEFT OAR | 10:03:25 AM |
| 963 | Player 2 | RIGHT OAR | 10:03:30 AM |
| 964 | Player 1 | LEFT OAR | 10:03:45 AM |
| 965 | Player 2 | RIGHT OAR | 10:06:09 AM |
| 966 | Player 1 | RIGHT OAR | 10:06:11 AM |
| 967 | Player 1 | RIGHT OAR | 10:06:15 AM |
| 968 | Player 1 | RIGHT OAR | 10:06:20 AM |

In some embodiments, the determination of whether the spin results include "a complementary sequence of symbols" may require, for example, that player's contribute a pair of compatible (or balanced) game pieces in an alternating sequence every thirty seconds to be considered a "complementary sequence." Thus, in the above example sequence of game pieces, pieces 961 through 964 meet the criteria of this example to be considered a complementary sequence. However, the remaining game pieces do not. Piece 965 arrived (occurred) too late after the thirty second deadline, and 966 through 968 do not form balanced pairs (nor do they alternate). Thus, in any particular embodiment, any type of criteria may be chosen as a gate to whether the individual player contributions include a complementary sequence.

Likewise, in Step SC4, in any particular embodiment, any type of criteria may be chosen as a gate to whether the individual player contributions include a conflicting sequence of symbols, game pieces, and/or spin results. Referring again to the example sequence above, the sequence of game pieces 965 through 968 may be deemed conflicting if the criteria of a particular embodiment specifies that, for example, more than two unbalanced (or incompatible) game pieces in a row is a conflict.

In some embodiments, advancing a cumulative outcome in Step SC3 means moving players closer to achieving a secondary or overall objective. For example, in a secondary game that is based on a virtual boat race, advancing a cumulative outcome may involve moving the players' boat icon along a virtual regatta course. Likewise, regressing a cumulative outcome in Step SC5, may involve steering the players' boat off course, moving it in the wrong direction, stalling it in place, or otherwise not advancing it.

In some embodiments, play of the secondary game continues until a termination event is detected in Step SC6. A termination event may comprise the completion of a given number of spins, an elapsed duration of time (e.g., the end of a prepaid gaming session), and/or a particular spin result. In some embodiments, a termination event may comprise the completion of the secondary game objective. In some embodiments with team competitions, a competing team achieving a secondary game objective could result in a termination event for other competing teams.

In embodiments where two or more players play a collaborative secondary game that is dependent on separate primary games hosted by two or more gaming devices (or a multiplayer device), the collaborative secondary game may be based on popular games such as the "Monopoly®" and/or the "Sorry!®" board games by Milton Bradley®. For example, players may register to play such collaborative secondary games at a dedicated terminal (e.g., a kiosk) or at the gaming devices themselves. Players may select or be assigned separate "game related identities" (e.g., "game piece" icons, such as a hat, an iron, a race car) for use in the collaborative secondary game. At separate (but perhaps physically adjacent) gaming devices (or on multiplayer gaming devices), the players then commence play of the primary games (e.g., standard slot machine games), which affect their common standing in the collaborative secondary game. For example, a first player might receive a certain property symbol on the reels of a first gaming device through a primary game, and a second player might independently receive a second, similar property symbol on the reels of a second gaming device through a second primary game. The acquired property symbols ("assets") may together form a "monopoly" in the collaborative secondary game, and both players may be provided with a bonus payout accordingly. For example, if a first player acquires "Pennsylvania Avenue" and "North Carolina Avenue" and a second player acquires "Pacific Avenue," a "green" monopoly is formed.

The steps of such an embodiment follow. Although the below embodiment may be described as being performed by a central server, such an embodiment may be facilitated by one or more gaming devices communicating directly with each other or a stand alone multiplayer device.

At a first step, the central server receives a request from two or more players to register for a collaborative secondary game. In one embodiment, two or more players may "pre-register" to play a collaborative secondary game at a dedicated device (e.g., a "registration" kiosk) that is operatively connected to the central server. In various embodiments, such players may be required to (a) enter player tracking cards into the dedicated device, (b) select separate game related identities, and/or (c) pay a fee to pre-register for the collaborative secondary game. In another embodiment, players may register for collaborative secondary games from one or more gaming devices. For example, prior to or during play of a primary game, a player may be provided with an offer (through the gaming device's screen) to "team up" with the player sitting next to her by pressing a button. A player at an adjacent gaming device may similarly be provided with such an offer. Alternately, a first player of a first gaming device may indicate to "team up" with a second player of a second gaming device by inputting a second device identifier, which may be visible to players by way of device signage (e.g., "Machine #1407"). Each player may be assigned, or may select, game related identities and may be required to provide additional payment.

It should be noted that game related identity preferences might be stored for each player in a database (e.g., FIG. 6). Such stored game related identities may be recalled by the gaming server and/or gaming device(s) upon presentation of player tracking cards. In this way, players may have their favorite game pieces (e.g., in the case of a Monopoly® embodiment, hats, thimbles, race cars, dogs, etc.) stored in association with their player tracking cards.

Next, the server initiates a primary game at a first gaming device. For example, a player may commence slot machine play in a conventional manner by depositing a wager amount and initiating a handle pull. Then, the server initiates a primary game second gaming device.

The server then initiates a secondary game and outputs a secondary game status. After both registered players have commenced play of separate primary games at separate gaming devices, the server may begin to output status regarding the collaborative secondary game to the players. For example, secondary game screens may show the players' initial standing in the collaborative secondary game by showing the players' game related identities at a starting position on a representation of a Monopoly® style game board.

Next, the server determines an outcome of the primary game at the first gaming device. That is, in a conventional manner, an outcome is determined at a first gaming device. Such an outcome may yield a payout for a first player without affecting the collaborative secondary game. Then, the server determines an outcome of a primary game at the second gaming device.

Thereafter, the server adjusts a secondary game status based on at least one of the determined outcomes. In other words, based on at least one outcome determined at one of the gaming devices, the server determines whether to adjust the status of the collaborative secondary game. For example, if one player receives a certain property symbol on the reels of her slot machine, both players may receive the property symbol in the collaborative secondary game.

Next, the server determines whether to provide a payout to the players based on the adjusted secondary game status. For example, based on the players' shared status in the collaborative secondary game, the server may determine that the players should be awarded a bonus payout (e.g., $2 each), which may be provided directly through the separate gaming devices.

In some embodiments, a player may initiate a primary game without indicating to "team up" with another player pursuant to a collaborative secondary game. In one such embodiment, a secondary display screen may be used to output a message encouraging the player to engage in collaborative play (e.g., a display screen reads, "Did you know you can team up with other players to build valuable Monopolies? Press the "Team Play" button to learn how.").

Another exemplary method according to some embodiments of the present disclosure may be described as follows. In Step 1, payment is received for a gaming session. The gaming device receives payment from players wishing to begin a gaming session. In one embodiment, players each pay a flat price for a specific length of gameplay. For example, a game may cost $5, in exchange for which each player receives 25 'spins' such as rolls of virtual dice, or reel spins. Players may be able to increase payment for longer gaming sessions, or wager more per gaming session. Either or both players may submit payment via a common device, or each may be provided with separate devices through which the players can submit payment.

In Step 2, the gaming session begins. After payment for the gaming session is received and players are ready, the gaming session begins. Game parameters are determined by the controller or the gaming device, including: number of 'virtual' or house players (in competition with human players); assets assigned to each of the players (for example, in a monopoly-type game, properties and railroads may be assigned to players, or players may be able to pick the properties they wish to own for the duration of the gaming session); and/or starting game money balance of each player (for example, players may receive a flat amount of game money per gaming session) Game money may represent non-cash value game currency for use during a gaming session. For example, players may receive $1,500 in game money for a $5 wager. Additionally, players may be able to raise their wager for higher amounts of game money, and/or exchange assets for game money.

In Step 3, game play begins. Game play commences after game play parameters are determined. In some embodiments, game play consists of each player taking turns rolling 'virtual' dice, and moving a character representative of the player around a digital board. Based on the outcome of the dice, the character of the player moves, landing on a space on the board. If the space on the board corresponds to an asset of another player (see databases herein), the player landing on the space may pay a penalty out of his/her gaming money account, or receive a bonus, based on the game parameters. In one embodiment, gameplay continues until a predetermined number of player turns is reached. For example, gameplay may conclude when each player has taken 25 turns. Many configurations of gameplay parameters are possible.

In Step 4, game play ends. In some embodiments, game play continues until a predetermined number of player turns is reached. For example, gameplay may conclude when each player has taken 25 turns. There are many other ways in which the conclusion of gameplay may be determined, such as concluding gameplay if a player's game account reaches a specific low or high balance (e.g., $0 or $2,000), a player quits the game, a player reaches a threshold above all other players (e.g., player's gaming account is twice all other players combined), or based on other parameters.

In Step 5, payouts are provided based on the game money of each player. Using a payout database for example, the players are issued payouts based on at least one gaming parameter, such as the player's game money balance at the end of the game. In some embodiments, the amount of game money the player has at the end of a game or gaming session is used as an index into the payout database, and a corresponding amount of actual money or credits is paid out to the player(s). Players may be paid via one or more benefit output devices, such as one or more coin trays, cashless gaming receipt printers, etc. Players may need a threshold amount of game money to receive payouts.

Yet another exemplary method according to some embodiments of the present disclosure may be described as follows. In the first step, a gaming session begins. Players begin a gaming session. In this exemplary game, two players play a multiplayer device, each position having traditional three reels, individual payment and control mechanisms. Each player's reels, however, have a special symbol. Together the two players must collect the special symbols in order to win payouts. Each player pays for the gaming session via individual payment mechanisms, and is able to view their progress via a display screen which displays information regarding the progress of the two players.

In the second step, at least one outcome of a first player is received. The two players begin gameplay and receive outcomes. The multiplayer gaming device tracks the player's outcomes and displays them via the display screen common to both players. In some embodiments, the two players are playing a three-legged race game in which the two players must alternatively receive special symbols enabling their character (displayed via the display screen) to walk toward a finish line. The gaming device detects outcomes including the special symbols, and adjusts the display and other game data accordingly.

In the third step, at least one outcome of a second player is received. As with the first player, the gaming device detects the outcome of special symbols and adjusts game data and displays accordingly. In some embodiments, the first player must receive the special symbol first, and the players must alternate receiving the special symbols for their character to advance. For example, special symbols received by the second player may not count until the first player receives a special symbol.

In the fourth step, based on at least two of the outcomes, at least one payout is determined. The game may conclude when a predetermined number of turns, or a time limit is reached. Upon game conclusion, players may receive individual or common payouts based on the success of their character, determined by the number of and order in which special symbols are received. For example, if the players moved their character fifty feet of a possible one-hundred feet, the two players may receive a payout equal to half of the top payout. A number of payout scenarios are possible based on the type of game and casino preferences.

In the fifth step, based on the determined payout(s), payouts, if any, are provided to players via each player's respective payment system or via a shared payment system. In one embodiment, players receive payouts throughout the game, in addition to or instead of one or more payouts at the conclusion of the game.

F. EXAMPLE ILLUSTRATIVE EMBODIMENTS OF THE DISCLOSURE

The following very specific additional examples are provided to illustrate particular embodiments of the present disclosure, particularly from the perspective of potential users of the disclosure, including players and casinos.

Example 1

Two players play a 'Million Dollar Monopoly' game. Player sit at the gaming device, which features separate controls and displays for each player, and a common display screen showing the game board and each player's game piece. Players pay for the game, and each receives an amount of gaming money and properties. Players can cooperate and trade properties in order to form monopolies. For each monopoly made, each player gets a bonus. The game lasts until both players are bankrupt, the players losing money when they land on board spaces that neither of them own. Payouts are made based on the number of successful turns each player takes before becoming bankrupt. At the end of the game, the machine pays each player via his/her respective coin tray.

Example 2

Two casino players play a multiplayer Monopoly®-style game. The machine features two seats and controls for each player, as well as a single large Monopoly®-style board display. Players compete against virtual house players for prizes. Beginning their game, the two players pre-pay $5 for the game, and receive $1500 in Monopoly® money and two monopolies each. Beginning the game, each player (including the virtual house players) takes turns rolling virtual dice, via the machine controls. If a player lands on a property owned by another player, the player must pay any fees associated with the property, which are deducted from the player's Monopoly® money account. The game ends when each player has rolled the dice 25 times. At the end of the game, the players are paid by the machine based on the amount of cash and/or monopolies they have left.

Example 3

Two players sit at a multiplayer 'three legged race' slot machine. The object of the game is for the players to enable their avatars, displayed as two people with each of their right and left legs respectively adjoined, to cross a finish line. When they begin playing, the race starts. The players have three minutes to get their avatar across the finish line, and then the game ends and a new game begins. In addition to traditional reel symbols and payouts, the player on the left has reels including a 'left leg' reel symbol, and the player on the right has reels including 'right leg' reel symbol. Not only must the players receive a certain number of the symbols in order to get their avatar across the finish line, but they also must receive the symbols in 'stride' so the avatar doesn't veer off course. As the game begins, player 2 receives three right leg symbols in a row, moving the avatar slightly forward, but turning the avatar left at the same time. Then player 1, playing even faster in an effort to straighten out the path of the avatar, receives four left leg symbols, correcting the avatar's course and turning it slightly right. As the game progresses the players receive traditional bar and seven combinations and payouts. At the end of the three-minute game the players fell short of the finish line and did not receive bonus payouts. The avatar is returned to the starting line and the players are able to restart the race.

G. ADDITIONAL EMBODIMENTS

In some embodiments, players or teams of players can compete against each other, either directly (e.g., team v. team) or as groups (e.g., one team out of ten wins a race). In a team v. team embodiment, two pairs of players may compete in a monopoly-type game (described above). In a group embodiment, multiple teams may compete to, for example, win a race. For example, two players may compete against other pairs of players in a multiplayer canoe race game. Each team of players sit at team machines (e.g., machines that are on the same 'team') and together compete with other teams to get their canoe up the river first, by receiving the most canoe reel symbols within an allotted timeframe. The teams of players play the machines as they usually would, and receive common outcomes. Once every twenty minutes, the machines participating in the canoe race announce via an audio message, "its time to race!". Players are allowed to opt-in to the race by placing a bonus bet. For the following 100 reel spins, the team of players that receives the most canoe reel symbols and thus pushes their canoe up the river the farthest wins the bonus payout. In addition to the bonus game entry, players can bet on which canoe they think will win the race, lose the race, place second, etc.

In some embodiments, players may be able to retain certain parameters of the previous game for use in the next game. For example, a player may like the assets he/she was assigned for the previous game, and may choose to keep the same configuration and/or pay to keep the current configuration. Players can begin a new game by inserting credits, or directing the gaming device to debit an account of credits of the player(s).

In some embodiments, two or more existing slot machines may be operatively connected to provide multiplayer functionality. For example, two existing slot machines may be combined with a common display screen on which data representative of a game played by players operating both slot machines, and/or generated or received from both slot machines may be displayed.

The following very specific additional examples are provided to illustrate particular alternate embodiments of the present disclosure.

Example 4

Two casino patrons sit together at a new 'multiplayer' slot machine. The machine has three reels with common symbols, and special 'helium balloon' symbols. As the two players play the slot machine, the special helium balloon symbols appear every few reels spins. When a special symbol is received on the pay line for either player, it lifts a random number of coins from a virtual treasure chest, and drops the coin(s) into either a joint account of the players (e.g., the two players split the prize), or into an account of one or the other player randomly.

Example 5

Two casino patrons decide to play a new multiplayer slot machine. Sitting at the machine they learn that the machine offers standard payouts, and a special payout that allows the players to combine each of their three reel outcomes to form a six reel outcome, providing they insert an extra coin per pull to play the 'bonus' game. Both playing the bonus game, on their 4th spin they each receive three bars, combining to form a six bar payout in addition to their individual three bars each payout. The payout for the six bar outcome is evenly distributed to the two players.

A few spins later, they again each receive three bars. Player 1, however, neglected to insert the coin to play the bonus round. Instead of receiving half each of the bonus payout in addition to the standard payout for three bars, the bonus payout is negated and the players each receive the standard three-bar payout.

Player 2, frustrated with Player 1 for not paying for the bonus round, decides to pay for the bonus spin for both players, doubling her bonus round bet (e.g., plays one coin for herself and one coin for her partner). A few spins later the two players each receive three sevens. Player 1, neglecting to play the bonus round, receives the standard payout for three sevens. Player 2, playing the bonus bet for both players, receives the standard payout for three sevens as well as double the bonus payout (i.e., the bonus prize that would have been awarded to player 1 is instead paid to player 2.)

Turning now to the focus of the present disclosure, an example may be helpful. Normally, when spinning a slot machine, a player has few options for betting. The player may select the number of lines and the number of credits per line. Players who bet the maximum credits on each line are sometimes referred to as having made a "max bet". To facilitate players placing such wagers, many game devices are equipped with a button labeled "max bet" or "max credit" which automatically populates each line with a maximum credit wager. In some games, utilization of the max bet wager option qualifies the player for participation in a progressive game or bonus game.

The present disclosure offers a gaming device with both a "max bet" and a "max bet with multiplayer" button. The multiplayer options may cost an extra few credits and represents the true maximum bet the machine will take on a given spin. An illustrative user interface 1000 is presented in FIG. 10. In particular, the user interface comprises a display 1002 with symbols 1004 from an outcome displayed thereon. Additionally, various line bet buttons 1006 and credits/line bet buttons 1008 are available to the player. While displayed as mechanical buttons, it should be appreciated that the buttons may be part of a touch screen or otherwise implemented as desired. A max bet button 1010 is also offered to provide, in this case, a ten credit wager on each of the nine paylines offered on the gaming device. That is, if the player uses the max bet button 1010, the player is wagering ninety credits. The user interface 1000 also includes a max bet with multiplayer feature button 1012. Use of this button may cost ninety-five credits, but enables the multiplayer feature as described below.

In an illustrative embodiment, when the max bet with multiplayer feature wager option is activated on two linked machines (linked through any of the techniques described above such as shared cabinetry, through a network or the like), the subsequent spin allows the multiplayer game play. Various types of multiplayer game play are contemplated. Some game machines may only have one type of multiplayer game play, but others may have multiple multiplayer options and buttons may be provided for each option as better illustrated in FIG. 11.

Figure 11:
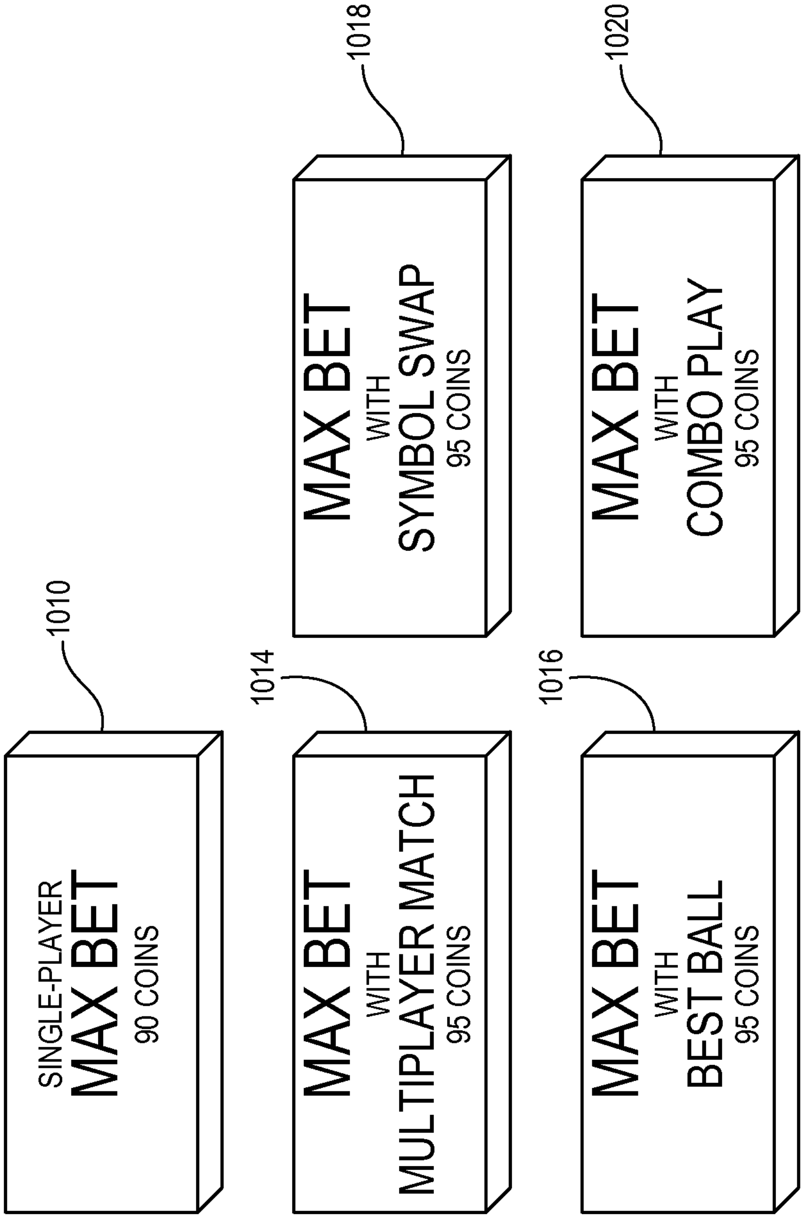
FIG. 11 illustrates various multiplayer max bet buttons that may be used on the player interface of FIG. 10.

As illustrated in FIG. 11, a max bet with multiplayer match button 1014, a max bet with best ball button 1016, a max bet with symbol swap button 1018, and a max bet with combo play button 1020 may be offered. Continuing the example of FIG. 10, if a normal max bet is ninety credits, each of these multiplayer options requires ninety-five credits. Of course other price differentiation may be used as desired to make the profit margin on the multiplayer option palatable to the gaming establishment.

Figure 12:
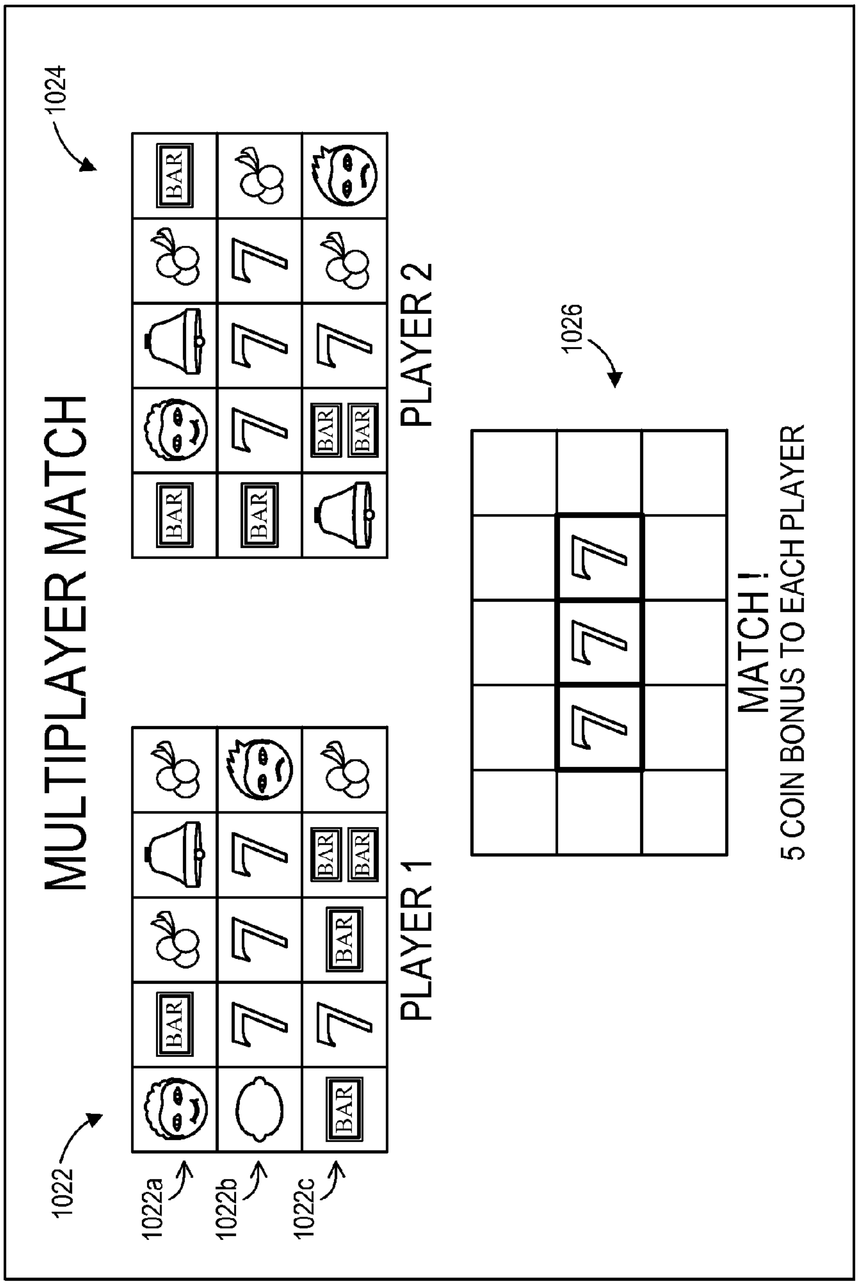
FIG. 12 illustrates an exemplary communal display that shows each player's individual outcome as well as the multiplayer match feature.

While several specific multiplayer wagers are contemplated, the present disclosure is not so limited. However, an overview of the particularly contemplated embodiments is provided. If the multiplayer option is a match option, then each player's machine may generate an outcome, such that each displays a spinning set of reels resolving to a final array of symbols (or other animation depending on the game). Payouts may be paid to each player individually at this time for any winning combination of symbols on that player's display as indicated by an associated paytable. After single player payouts are awarded, the activated multiplayer feature is utilized. Each player's screen shows a "Multiplayer Match!" graphic. Alternatively a communal display shows the graphic. An exemplary graphic is illustrated in FIG. 12. As illustrated, a first player has an outcome 1022. On payline 1022*a*, the player has two cherries. An outcome of two cherries receives a payout of three credits. On payline 1022*b*, the player has three sevens. An outcome of three sevens receives a payout of ten credits. On payline 1022*c*, the player has a single cherry. A single cherry has a payout of one credit. The second player has an outcome 1024 with various individual payline payouts. The communal display also shows the match outcome 1026 which highlights the matched three sevens between the first outcome 1022 and the second outcome 1024. A bonus payout of five credits is paid to each player.

Other multiplayer options include a best ball option, a symbol swap option, and a combo play option. For more information about a best ball multiplayer game, the interested reader is directed to the previously incorporated U.S. Pat. No. 6,142,872 and its family of patents. The symbol swap option allows players to switch symbols, in theory so that the players have higher individual awards, although such is not strictly required. The combo play option allows a single new group outcome to be formed from the individual outcomes achieved by each player. Each symbol from each individual outcome is used to create a new group outcome that is twice as large and evaluated against a separate hyper or ultra outcome pay schedule. Another version of the combo option is an outcome pool such that a single new group outcome is created from the individual outcomes achieved by each player. Each symbol from each individual outcome is entered into a pool. From this pool, the best outcome that can be assembled is created. For example, if player one achieves a Cherry-Cherry-Bar and player two achieves a Seven-Cherry-Bar, an outcome of Cherry-Cherry-Cherry is assembled.

Figure 13:
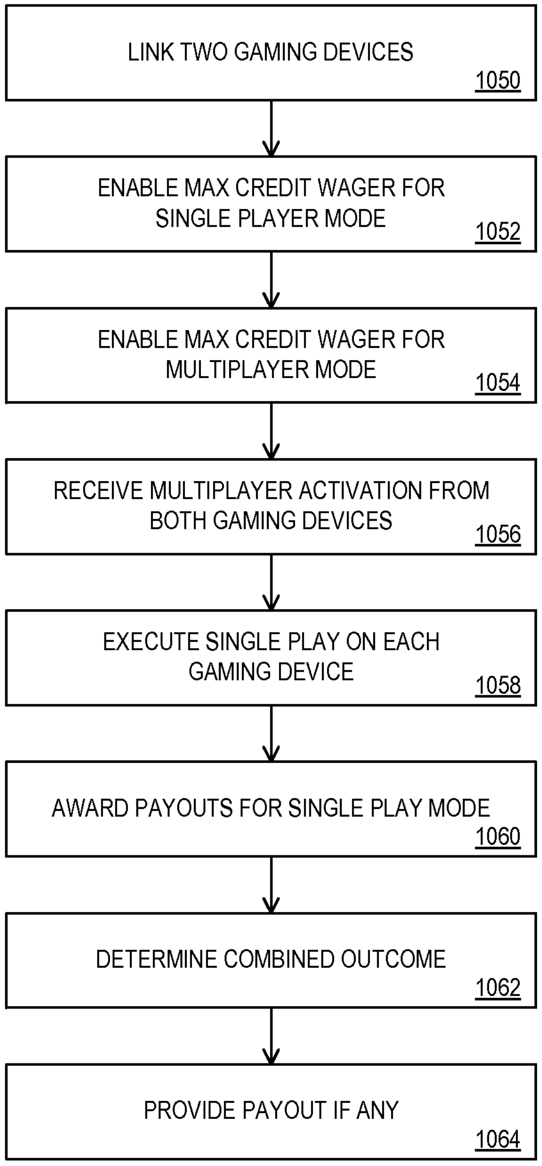
FIG. 13 illustrates an exemplary flow chart showing an embodiment of the multiplayer match methods.

An overview of the methodology of the present disclosure is provided in FIG. 13. As noted above, initially, at least two gaming devices are linked (block 1050). This linkage may be by virtue of the shared cabinet arrangement described above or through a network as desired. The network may be a peer-to-peer network, or in a server-client arrangement as desired. As an alternative to a shared cabinet arrangement, two machines may be positioned on the same platform, share signage, and/or share a community display. Such machines could be networked as noted above.

A control system enables a max credit wager for a single player mode on each machine (block 1052) and a max credit wager for multiplayer mode on each machine (block 1054).

As noted above, the max credit wager for multiplayer mode may be greater than the max credit wager for single player mode.

Both players may then activate the max bet with multiplayer option. A control system associated with the system receives the multiplayer activation from both gaming devices (block 1056). The control system allows the local controller of the gaming device to execute a game start for single play mode on each gaming device (block 1058). Alternatively, the central controller may execute each single play mode game start.

The control system awards payouts for the single play portion of the game play based on the single play payout schedule (block 1060). The control system then determines the combined outcome from the two single play outcomes (block 1062) and provides payouts if any (block 1064) based on the combined outcome.

The combined outcome may have, as noted above, a variety of different mechanics. In a first embodiment, the combined outcome is a match outcome, where outcomes from each player are compared to determine matching symbols. As shown in FIG. 12, the symbol arrays of the first and second player have three seven symbols in the center. This may pay a bonus according to a pay schedule for matches. Players may review the match pay schedule on the belly glass of the gaming machine, on a peripheral device, or other location as desired. Note that in a particularly contemplated embodiment, players are paid both for the single player result and the matched result, although such is not strictly required. Instead of the match outcome 1026, each player may have the matching portion of their outcome highlighted or otherwise demarcated to indicate a match.

In a second embodiment, the combined outcome is the result of a symbol swap. Players may be allowed to trade or exchange one or more symbols between outcomes. For example, a first player may trade a cherry to a second player so that the second player has a five cherry payline to achieve a large payout. Restrictions may be placed on (i) the number of symbols available for trade (e.g., one symbol per player), (ii) the types of symbols that may be traded (e.g., players may not trade wild symbols), (iii) positions from which a traded symbol may be moved or placed into, or the like. In one embodiment, any payout achieved after a trade of symbols may be shared by both players (e.g., a 50/50 split). In other embodiments, the player achieving the winning outcome after the swap may keep everything. Symbol exchange may be automatically performed or players may be given the opportunity to control the swap. In one embodiment, players may be paid for the single player outcomes and for any outcomes achieved after the swap. However, payouts after the swap may be limited to affected paylines. Alternatively, the payout for the post swap is reduced by the amount of the payout pre-swap. For example, if pre-swap a player has four cherries for twenty credits, and post swap, the player has five cherries for eighty credits, the player only receives sixty credits post swap. Swapping may be done by a player using a touch screen to indicate which symbols to trade either by highlighting, dragging/dropping, or other technique as desired.

In a third embodiment, the combined outcome is the best ball embodiment wherein both players are paid for the best outcome achieved between the two outcomes. If both outcomes are winners, the lowest-paying outcome is discarded and both players are paid the higher value. The higher value may be paid to both, or the higher value may be split between the players. The display may show both outcomes and then highlight which outcome is being used for the payout.

In a fourth embodiment, the combined outcome is a combo outcome such as the ultra or hyper outcome of a super flush, double straight, ten cherries or the like.

In a fifth embodiment, the combined outcome is a combo outcome created from a pool. This is like the fourth embodiment, but instead of a straight combination of paylines, all the symbols may be mixed and matched to come up with an ultra or hyper outcome.

While not central to the game play, the multiplayer feature may be advertised in a number of ways. In a first embodiment, the game machines that have the multiplayer feature enabled share joint physical signage (e.g., a sign overarching both machines indicates the multiplayer functionality). In a second embodiment, each machine has its own signage and/or the glass on the machine promotes the availability of the feature. In a third embodiment, a peripheral device associated with the gaming device provides the promotional material. Note that such a peripheral device could also be used to display the combined outcome and inform players about whether the multiplayer game play has a payout or not. In a fourth embodiment, a community screen may provide the promotional material (and may also be used for outcome presentation).

While the above discussion has focused on two gaming devices, it should be appreciated that more than two may also be used. Likewise, while the above discussion has contemplated that the player uses a max bet with multiplayer option button, it is possible that for a fixed additional wager, the player may participate in multiplayer game play without having bet the maximum wager in the single player game. For example, a player may bet one credit per line, all lines, and pay an additional five credits to participate in the multiplayer game play. The player is still paying a premium to participate, but is not required to bet the maximum number of credits in the single player portion of the game play. A button, either physical or part of a touch screen may enable the multiplayer game play in this fashion. Note that if a player does not activate a payline, that payline may or may not be eligible to contribute to the multiplayer game play as desired by the gaming establishment.

While it is contemplated that gaming devices may be permanently linked for multiplayer game play, it is also possible that the machines are dynamically linked, either by the gaming establishment or by player request. Menus may be provided to the player so that the player can designate a machine as the one to which the player desires to link. The player on the designated machine may be queried as to whether they would like to participate in multiplayer game play. Instead of menus, a button may be provided to link the machine to a particular proximate machine (e.g., a left arrow button links the machine to the machine to the left). Instead of a particular machine, a player may search for another player (e.g., a husband asks his wife to play multiplayer game play). The second player may be identified through a player tracking number or other mechanism as desired.

In a particularly contemplated embodiment, the multiplayer function is only active if both players pay the additional multiplayer wager. In an alternate embodiment, a first player may pay to have the multiplayer wager active for the second player. Likewise, to avoid confusion, a confirmation screen may be used to help educate the players. The confirmation screen may initially confirm the linkage and then confirm that the feature has or has not been activated. The confirmation screen could be a separate image on the display of the gaming device, appear on the communal display, appear on the peripheral display or elsewhere as desired. The confirmation screen could be its own image or incorporated into a larger image (e.g., a flag appears in the upper right corner of the game screen indicating the multiplayer game play feature is active). If the confirmation is not available, a pending message or the like may be presented. Alternatively, the multiplayer feature may always be on for every max bet wager made by the player.

If one player has activated the multiplayer game feature, but the other player has not, there are several ways to address the issue. In a first embodiment, the first player still gets to use the outcome from the second gaming device as part of the multiplayer game, but the second player is not eligible to receive any part of any payout from the multiplayer game. In a second embodiment, the first player is not charged the activation fee and both machines operate in normal single player mode. A message may be output to the first player explaining that the second player did not join the multiplayer game. Likewise, a message may be output to the second player explaining what payout the second player forewent by not joining the multiplayer game.

In a third embodiment, the player who activated the feature may see a countdown screen allowing the second player some time to activate the multiplayer feature. If the second player does, then the spins may be lined up appropriately in time. If the second player does not, the first player may not be charged an activation fee as above.

In a fourth embodiment, the result from the first player may be saved and compared to the next feature activated spin of the second player.

In a fifth embodiment, the wager goes into a personal progressive for the first player. Then, if the player hits a jackpot, the amount of the personal progressive may be added to the jackpot. Other outcomes may also result in the personal progressive being awarded besides the jackpot.

Note that not all these embodiments are mutually exclusive. For example, a symbol swap may be paired with a match embodiment or best ball embodiment.

A few notes about the payout are also merited. The pay schedule may be associated with each feature. It may be stored at each gaming machine or centrally stored on a slot server. As noted above, the pay schedule is likely to be designed to create a profitable hold percentage for the gaming establishment. For example, on average, for every five credits collected as part of the multiplayer feature, four credits may be paid out. Payouts may be made in a variety of ways including adding credits to a credit balance, a cash payout, a cashless gaming receipt or the like. In still another embodiment, the payout may go into a group account.

H. CONCLUSION

It should be noted that the embodiments described with reference to the following figures are presented for illustrative purposes only and are not meant to be limiting in any sense. It should also be noted that, as used herein, the terms "first embodiment", "second embodiment", "third embodiment", "an embodiment", "embodiment", "embodiments", "the embodiment", "the embodiments" "one or more embodiments", "some embodiments", and "one embodiment" mean "one or more embodiments" unless expressly specified otherwise. Further, although particular features of the present disclosure may be described with reference to one or more particular embodiments or figures, it should be understood that such features are not limited to usage in the one or more particular embodiments or figures with reference to which they are described.

Further, it should be noted that although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order.

It is clear from the foregoing discussion that the disclosed systems and methods to provide multi-player type games represents an improvement in the art of gaming. While the method and apparatus of the present disclosure has been described in terms of its presently preferred and alternate embodiments, those skilled in the art will recognize that the present disclosure may be practiced with modification and alteration within the spirit and scope of the appended claims. The specifications and drawings are, accordingly, to be regarded in an illustrative rather than a restrictive sense.

Further, even though only certain embodiments have been described in detail, those having ordinary skill in the art will certainly appreciate and understand that many modifications, changes, and enhancements are possible without departing from the teachings thereof. All such modifications are intended to be encompassed within the following claims.

What is claimed is:

1. A method for facilitating a game playable over the Internet, the method comprising:

determining, by a processor of a computing device operable to facilitate a multiplayer game, that a first player playing a first game has obtained a first element of the game;

storing in a memory of the computing device an indication of the first element as being usable by the first player in the game;

determining, by the processor, that a second player playing the first game has obtained a second element of the game;

storing in the memory an indication of the second element as being usable by the second player in the game;

determining, by the processor, an occurrence of a triggering event for a swapping of the first element of the first player for the second element of the second player;

effectuating, by the processor, a swapping of the first element of the first player for the second element of the second player by modifying the indications in the memory such that an indication of the second element rather than the first element is stored as being usable by the first player and an indication of the first element rather than the second element is stored as being usable by the second players;

determining that the first player is entitled to a benefit as a result of the swap and determining the value of the benefit by:

determining a payout the first player would have been entitled to if the swap had not been effectuated, thereby determining a preliminary payout;

determining a payout the first player is entitled to as a result of the swap, thereby determining an intermediate payout; and determining the value of the benefit to be the intermediate payout minus the preliminary payout; and providing the benefit to the first player.

2. The method of claim 1, wherein at least one of the first element and the second element comprises an element randomly won by a respective one of the first player and the second player.

3. The method of claim 1, wherein at least one of the first element and the second element comprises an element earned through skill by a respective one of the first player and the second player.

4. The method of claim 1, further comprising:

determining whether at least one of the first player and the second player had selected an option to allow swapping of game elements when initiating the first game; and only effectuating the swapping of the elements if the option had been selected.

5. The method of claim 1, further comprising:

combining the second element stored as usable by the first player in the first game after the swap with at least one other element associated with the first player to determine an outcome of the first game.

6. The method of claim 1, wherein the first game includes at least one restriction on swapping of elements by players of the game and wherein the method further comprises:

verifying, prior to effectuating the swapping, that effectuating the swapping would not violate the at least one restriction; and only effectuating the swapping if it would not violate the at least one restriction.

7. The method of claim 6, wherein the at least one restriction comprises at least one of:

(i) a maximum number of elements which may be swapped by a player; and (ii) a type of element that may be traded.

8. The method of claim 6, wherein at least one of the first element and the second element is associated with a particular aspect of the first game in which it was obtained or in which it may be utilized and wherein the at least one restriction comprises a restriction on a one or more aspects of the first game from which an element may be swapped.

9. The method of claim 1, wherein providing the benefit comprises:

providing a first portion of the benefit to the first player and providing a second portion of the benefit to the second player.

10. The method of claim 1, wherein the triggering event comprises a request from at least one of the first player and the second player to swap the first element for the second element.

11. The method of claim 10, further comprising:

receiving, from the first player, a request to swap the first element for the second element.

12. The method of claim 11, further comprising verifying that the second player agrees to the swapping of the first element for the second element.

13. The method of claim 11, wherein the request includes an identification of at least one of the first element and the second element.

14. The method of claim 11, further comprising:

selecting, on behalf of the first player, at least one of the first element and the second element to be swapped.

15. A non-transitory, computer-readable medium storing instructions for directing a processor of a computing device to perform a method, the method comprising:

determining that a first player playing a first game has obtained a first element of the game;

storing in a memory of the computing device an indication of the first element as being usable by the first player in the game;

determining that a second player playing the first game has obtained a second element of the game;

storing in the memory an indication of the second element as being usable by the second player in the game;

determining an occurrence of a triggering event for a swapping the first element of the first player for the second element of the second player;

effectuating a swapping of the first element of the first player for the second element of the second player by modifying the indications in the memory such that an indication of the second element rather than the first element is stored as being usable by the first player and an indication of the first element rather than the second element is stored as being usable by the second player;

determining that the first player is entitled to a benefit as a result of the swap and determining the value of the benefit by:

determining a payout the first player would have been entitled to if the swap had not been effectuated, thereby determining a preliminary payout;

determining a payout the first player is entitled to as a result of the swap, thereby determining an intermediate payout; and determining the value of the benefit to be the intermediate payout minus the preliminary payout; and providing the benefit to the first player.

16. An apparatus, comprising:

a processor; and a memory storing a program, the processor being operable with the program to:

determine that a first player playing a first game has obtained a first element of the game;

store in a memory of the computing device an indication of the first element as being usable by the first player in the game;

determine that a second player playing the first game has obtained a second element of the game;

store in the memory an indication of the second element as being usable by the second player in the game;

determine an occurrence of a triggering event for a swapping the first element of the first player for the second element of the second player;

effectuate a swapping of the first element of the first player for the second element of the second player by modifying the indications in the memory such that an indication of the second element rather than the first element is stored as being usable by the first player and an indication of the first element rather than the second element is stored as being usable by the second player;

determine that the first player is entitled to a benefit as a result of the swap and determining the value of the benefit by:

determine a payout the first player would have been entitled to if the swap had not been effectuated, thereby determining a preliminary payout;

determine a payout the first player is entitled to as a result of the swap, thereby determining an intermediate payout; and determine the value of the benefit to be the intermediate payout minus the preliminary payout; and provide the benefit to the first player.

* * * * *